US008947472B2

(12) United States Patent
Tien et al.

(10) Patent No.: US 8,947,472 B2
(45) Date of Patent: Feb. 3, 2015

(54) PIXEL ARRAY

(75) Inventors: Kun-Cheng Tien, New Taipei (TW);
Yu-Ching Wu, Kaohsiung (TW);
Ming-Huei Wu, Yilan County (TW);
Tien-Lun Ting, Taichung (TW);
Chien-Huang Liao, Hsinchu (TW);
Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 347 days.

(21) Appl. No.: 13/482,995

(22) Filed: May 29, 2012

(65) Prior Publication Data
US 2013/0120469 A1    May 16, 2013

(30) Foreign Application Priority Data

Nov. 11, 2011  (TW) ............... 100141251 A
Dec. 16, 2011  (TW) ............... 100146897 A

(51) Int. Cl.
*G09G 5/10*     (2006.01)
*G09G 3/36*     (2006.01)
*G02F 1/1337*   (2006.01)
*G02F 1/139*    (2006.01)

(52) U.S. Cl.
CPC ........ *G02F 1/133707* (2013.01); *G09G 3/3648* (2013.01); *G02F 1/133753* (2013.01); *G02F 1/1393* (2013.01); *G09G 2300/0447* (2013.01)

USPC ............................................. 345/690; 345/88

(58) Field of Classification Search
CPC .......... G09G 3/36; G09G 3/2003; G09G 5/10
USPC .......................................... 345/77, 204, 211
See application file for complete search history.

(56) References Cited

U.S. PATENT DOCUMENTS

| 6,940,575 | B2 | 9/2005 | Sunohara et al. | |
|---|---|---|---|---|
| 7,589,813 | B2* | 9/2009 | Chen et al. | 349/129 |
| 7,916,108 | B2* | 3/2011 | Yang et al. | 345/89 |
| 7,924,354 | B2* | 4/2011 | Lu et al. | 349/38 |
| 2007/0279344 | A1* | 12/2007 | Kimura et al. | 345/77 |
| 2008/0024704 | A1 | 1/2008 | Huang | |
| 2010/0321366 | A1* | 12/2010 | Hirato | 345/211 |

* cited by examiner

*Primary Examiner* — Andrew Sasinowski
(74) *Attorney, Agent, or Firm* — Jianq Chyun IP Office

(57) ABSTRACT

A pixel array includes a first color pixel unit, a second color pixel unit and a third pixel unit, and the first, second and third pixel units respectively include a scan line, a data line, an active device electrically connected to the scan line and the data line and a first pixel electrode electrically connected to the active device. The first pixel electrode has at least one first slit, and a first acute angle is formed between an extending direction of the first slit and an extending direction of the scan line. Any two of the first acute angle of the first color pixel unit, the first acute angle of the second color pixel unit, and the first acute angle of the third color pixel unit are different.

28 Claims, 17 Drawing Sheets

PIXEL ARRAY

CROSS-REFERENCE TO RELATED APPLICATION

This application claims the priority benefits of Taiwan application serial no. 100141251, filed on Nov. 11, 2011, and Taiwan application serial no. 100146897, filed on Dec. 16, 2011. The entirety of each of the above-mentioned patent applications is hereby incorporated by reference herein and made a part of specification.

BACKGROUND OF THE INVENTION

1. Field of the Invention

The invention relates to a pixel array. Particularly, the invention relates to a pixel array of a liquid crystal display (LCD) panel.

2. Description of Related Art

As liquid crystal displays (LCDs) are developed to have a large size, in order to resolve a viewing angle problem under a large size display specification, a wide viewing angle technique of a LCD panel has to be constantly developed. A multi-domain vertical alignment (MVA) LCD panel is a commonly used wide viewing angle technique.

In the LCD panel, an alignment pattern is designed to divide liquid crystal molecules of a same pixel region into a plurality of different alignment domains to achieve a wide viewing angle display effect, i.e. the MVA LCD panel. Limited by optical characteristics of the liquid crystal molecules, such type of the LCD panel may have a color shift phenomenon or inadequate color saturation under different viewing angles, which is generally referred to as a color washout phenomenon. Particularly, the color shift phenomenon or inadequate color saturation is more severe in a display image of a middle-low gray level. In order to mitigate such phenomenon, based on amelioration of a driving technique and a pixel design, a technique of forming display regions with different brightness in a single pixel region, and forming a plurality of alignment regions in each of the display regions with different brightness is provided.

Although the aforementioned methods for resolving the color shift phenomenon or inadequate color saturation can mitigate a problem of white-bias in case of a large viewing angle (side view), compared to a front view image, a side view image still has problems of blue-bias, green-bias or red-bias under different viewing angles.

SUMMARY OF THE INVENTION

The invention is directed to a pixel array, which is capable of mitigating a problem of an existing technique that a side view image has a color shift problem under different viewing angles compared to a front view image.

The invention provides a pixel array including a first color pixel unit, a second color pixel unit and a third color pixel unit, and the first color pixel unit, the second color pixel unit and the third color pixel unit respectively include a scan line, a data line, at least one active device electrically connected to the scan line and the data line and a first pixel electrode electrically connected to the active device. The first pixel electrode has at least one first slit, and a first acute angle is formed between an extending direction of the first slit and an extending direction of the scan line. Any two of the first acute angle of the first color pixel unit, the first acute angle of the second color pixel unit, and the first acute angle of the third color pixel unit are different.

The invention provides a pixel array including a first color pixel unit, a second color pixel unit and a third color pixel unit, and the first color pixel unit, the second color pixel unit and the third color pixel unit respectively include a scan line, a data line, at least one active device electrically connected to the scan line and the data line, and a first pixel electrode and a second pixel electrode electrically connected to the active device. Any two of an area ratio of the first pixel electrode and the second pixel electrode of the first color pixel unit, an area ratio of the first pixel electrode and the second pixel electrode of the second color pixel unit, and an area ratio of the first pixel electrode and the second pixel electrode of the third color pixel unit are different.

The invention provides a pixel array including a first color pixel unit, a second color pixel unit and a third color pixel unit, and the first color pixel unit, the second color pixel unit and the third color pixel unit respectively include a scan line, a data line, at least one active device electrically connected to the scan line and the data line, and a first pixel electrode and a second pixel electrode electrically connected to the active device. Any two of a voltage ratio of the second pixel electrode and the first pixel electrode of the first color pixel unit, a voltage ratio of the second pixel electrode and the first pixel electrode of the second color pixel unit, and a voltage ratio of the second pixel electrode and the first pixel electrode of the third color pixel unit are different.

According to the above descriptions, the color shift problem of the side view image of various color pixel units can be mitigated by adjusting the extending directions of the slits of the pixel electrodes, the area ratios of the pixel electrodes, the voltage ratios of the pixel electrodes of the first color pixel unit, the second color pixel unit and the third color pixel unit and combinations thereof.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
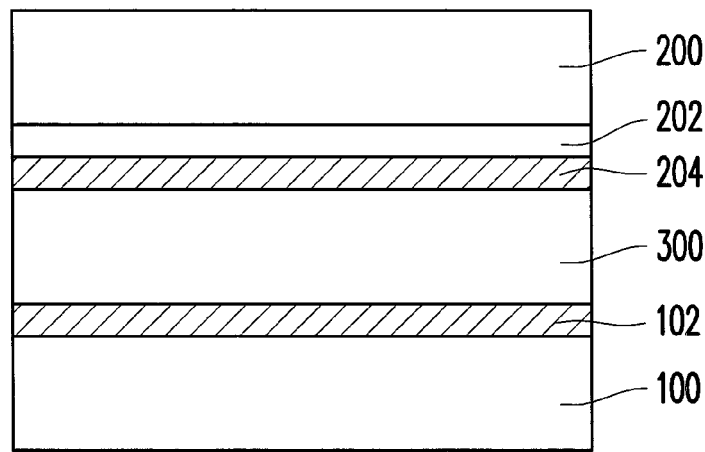
FIG. 1A is a cross-sectional view of a liquid crystal display (LCD) panel according to an embodiment of the invention.
Figure 1B:
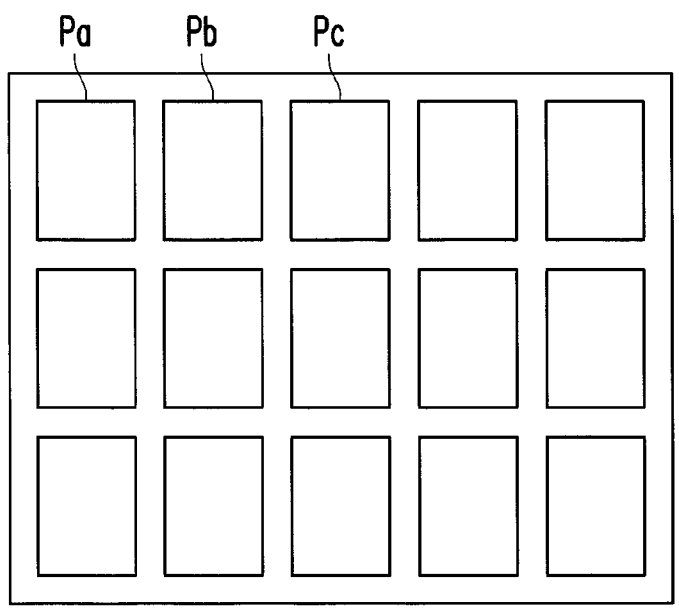
FIG. 1B is a top view of a pixel array of the LCD panel of FIG. 1A.

FIG. 1A is a cross-sectional view of a liquid crystal display (LCD) panel according to an embodiment of the invention. FIG. 1B is a top view of a pixel array of the LCD panel of FIG. 1A. Referring to FIG. 1A and FIG. 1B, the LCD panel includes a first substrate 100, a pixel array 102, a second substrate 200, a color filter array 202, a counter electrode 204 and a display medium 300.

The first substrate 100 and the second substrate 200 are mainly used to carry devices or film layers, and a material thereof is, for example, glass, quartz, organic polymer, or an opaque/reflective material (for example, a conductive material, metal, wafer, ceramic, or other suitable materials), or other suitable materials. The pixel array 102 is disposed on the first substrate 100, and includes a first pixel unit Pa, a second pixel unit Pb and a third pixel unit Pc. The color filter array 202 is disposed on the second substrate 200, and includes a first color filter pattern, a second color filter pattern and a third color filter pattern. Although the color filter array 202 is disposed on the second substrate 200, the invention is not limited thereto. In other words, in other embodiments, the color filter array 202 can also be disposed on the first substrate 100. Moreover, the electrode layer 204 can be further disposed on the color filter array 202. An electric field can be generated between the electrode layer 204 and the pixel array 102 to control or drive the display medium 300. Moreover, the display medium 300 includes a liquid crystal display medium or other suitable display medium.

As described above, the pixel array 102 and the color filter array 202 are disposed opposite to each other. For example, the first pixel unit Pa is disposed corresponding to the first color filter pattern, the second pixel unit Pb is disposed corresponding to the second color filter pattern, and the third pixel unit Pc is disposed corresponding to the third color filter pattern. The first color filter pattern, the second color filter pattern and the third color filter pattern are of different colors, for example. Therefore, the first, the second and the third pixel units Pa, Pb and Pc can also be referred to as a first, a second and a third color pixel units Pa, Pb and Pc. In the present embodiment, if the first color filter pattern, the second color filter pattern and the third color filter pattern are respectively a red, a green and a blue color filter patterns, the first, the second and the third color pixel units Pa, Pb and Pc are respectively red pixel unit Pa, green pixel unit Pb and blue pixel unit Pc. Designs of the first, the second and the third color pixel units Pa, Pb and Pc are described in following embodiments.

First Embodiment

Figure 2:
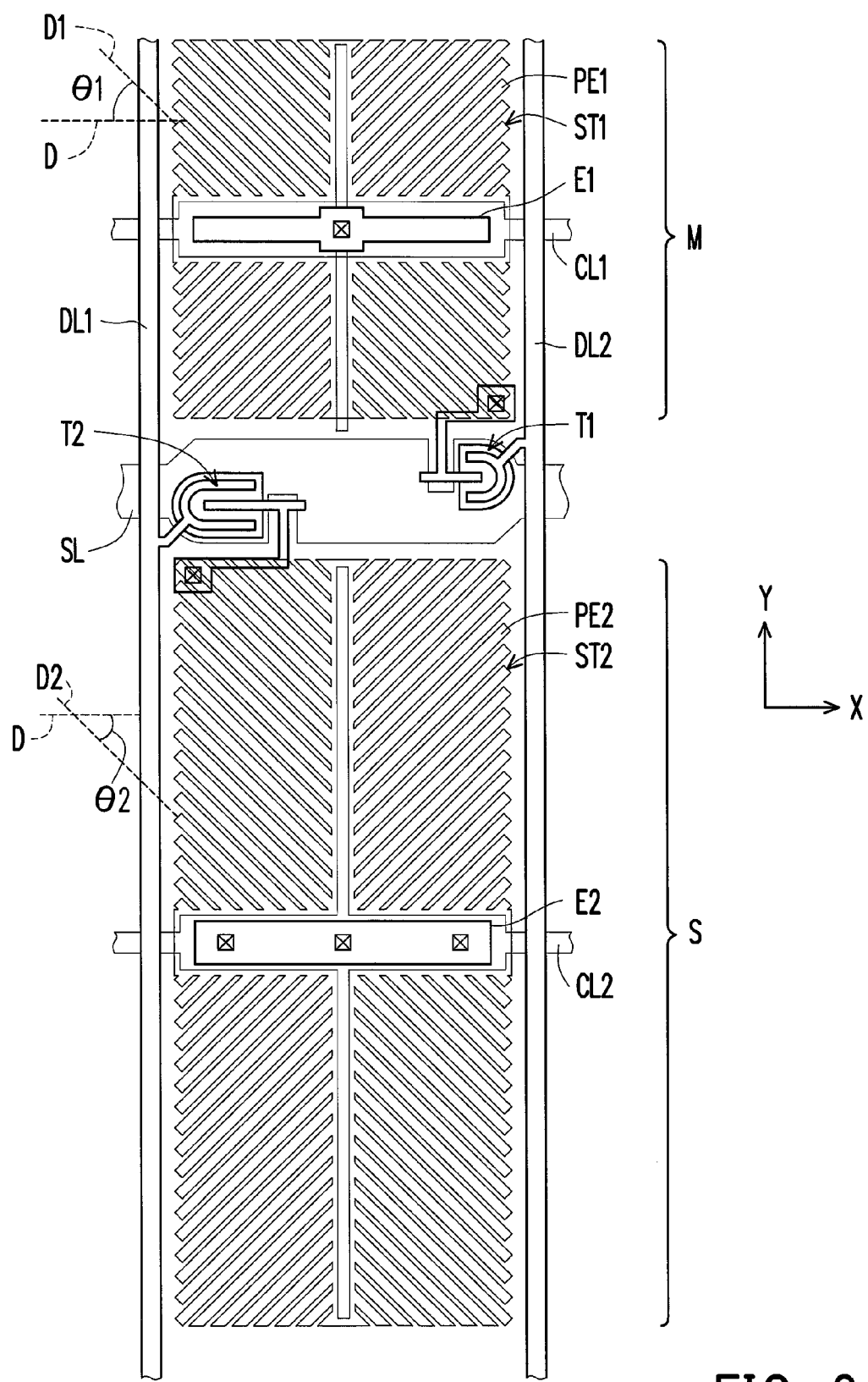
FIG. 2 is a schematic diagram of a pixel unit in a pixel array according to an embodiment of the invention.
Figure 3:
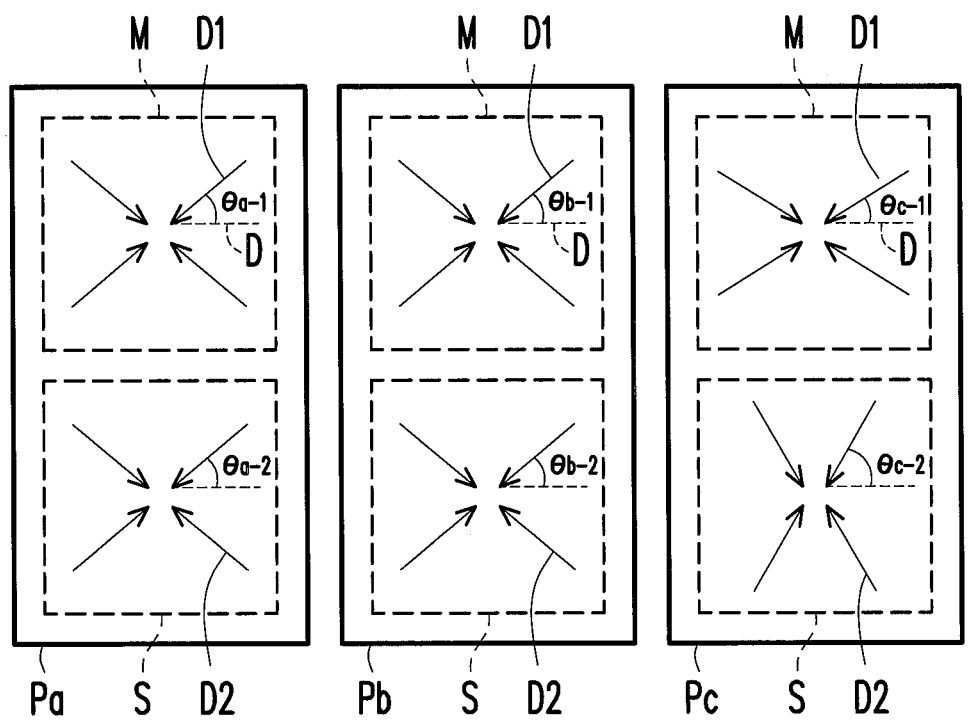
FIG. 3 is a schematic diagram of a pixel array according to an embodiment of the invention.

FIG. 2 is a schematic diagram of a pixel unit in a pixel array according to an embodiment of the invention. FIG. 3 is a schematic diagram of a pixel array according to an embodiment of the invention. A structure of each of the first, the second and the third color pixel units Pa, Pb and Pc is as that shown in FIG. 2, which includes a scan line SL, data lines DL1 and DL2, at least one active device T1 and T2 and a first pixel electrode PE1. Here, the first, the second and the third color pixel units Pa, Pb and Pc respectively further include a second pixel electrode PE2, capacitor electrode lines CL1 and CL2 and upper electrodes E1 and E2.

Here, the scan line SL and the data lines DL1 and DL2 are intersected, and an insulation layer is disposed between the scan line SL and the data lines DL1 and DL2. In other words, an extending direction of the scan line SL is not parallel to an extending direction of the data lines DL1 and DL2. Preferably, the extending direction of the scan line SL is perpendicular to the extending direction of the data lines DL1 and DL2. For example, the scan line SL extends along an X-direction, and the data lines DL1 and DL2 extend along a Y-direction. Considering the conductivity, materials of the scan lines SL and the data lines DL1 and DL2 are generally metal materials. However, the invention is not limited thereto, and in other embodiments, the materials of the scan lines SL and the data lines DL1 and DL2 can be other conductive materials, for example, alloy, nitride of the metal material, oxide of the metal material, nitride oxide of the metal material, or other suitable materials, or a stacked layer of the metal material and the other conductive material.

The active devices T1 and T2 can be bottom gate type thin film transistors or top gate type thin film transistors, which respectively include a gate, a channel, a source and a drain. The active device T1 is electrically connected to the scan line SL and the data line DL1, and the active device T2 is electrically connected to the scan line SL and the data line DL2.

Moreover, the active device T1 is electrically connected to the first pixel electrode PE1, and the active device T2 is electrically connected to the second pixel electrode PE2. Particularly, the first pixel electrode PE1 has at least one first slit ST1, and a first acute angle $\theta_1$ is formed between an extending direction D1 of the first slit ST1 and an extending direction D of the scan line SL. The second pixel electrode PE2 has at least one second slit ST2, and a second acute angle $\theta_2$ is formed between an extending direction D2 of the second slit ST2 and the extending direction D of the scan line SL. Generally, a region where the first pixel electrode PE1 locates is referred to as a main pixel region M, and a region where the second pixel electrode PE2 locates is referred to as a sub pixel region S.

Moreover, the capacitor electrode line CL1 and the capacitor electrode line CL2 are respectively disposed under the first pixel electrode PE1 and the second pixel electrode PE2. The upper electrode E1 can be further disposed between the capacitor electrode line CL1 and the first pixel electrode PE1 to form a storage capacitor. The upper electrode E2 can be further disposed between the capacitor electrode line CL2 and the second pixel electrode PE2 to form another storage capacitor.

In the present embodiment, the first slits ST1 of the first pixel electrode PE1 extend along four directions such that the first pixel electrode PE1 has four domain regions. Although only one extending direction of the first slit ST1 is indicated in FIG. 2, the four extending directions of the first slits ST1 respectively form the first acute angle $\theta_1$ with the extending direction D of the scan line SL. Similarly, the second slits ST2 of the second pixel electrode PE2 extend along four directions such that the second pixel electrode PE2 has four domain regions. Although only one extending direction of the second slit ST2 is indicated in FIG. 2, the four extending directions of the second slits ST2 respectively form the second acute angle $\theta_2$ with the extending direction D of the scan line SL. Therefore, eight domain regions are formed in the pixel unit of the present embodiment.

Figure 11:
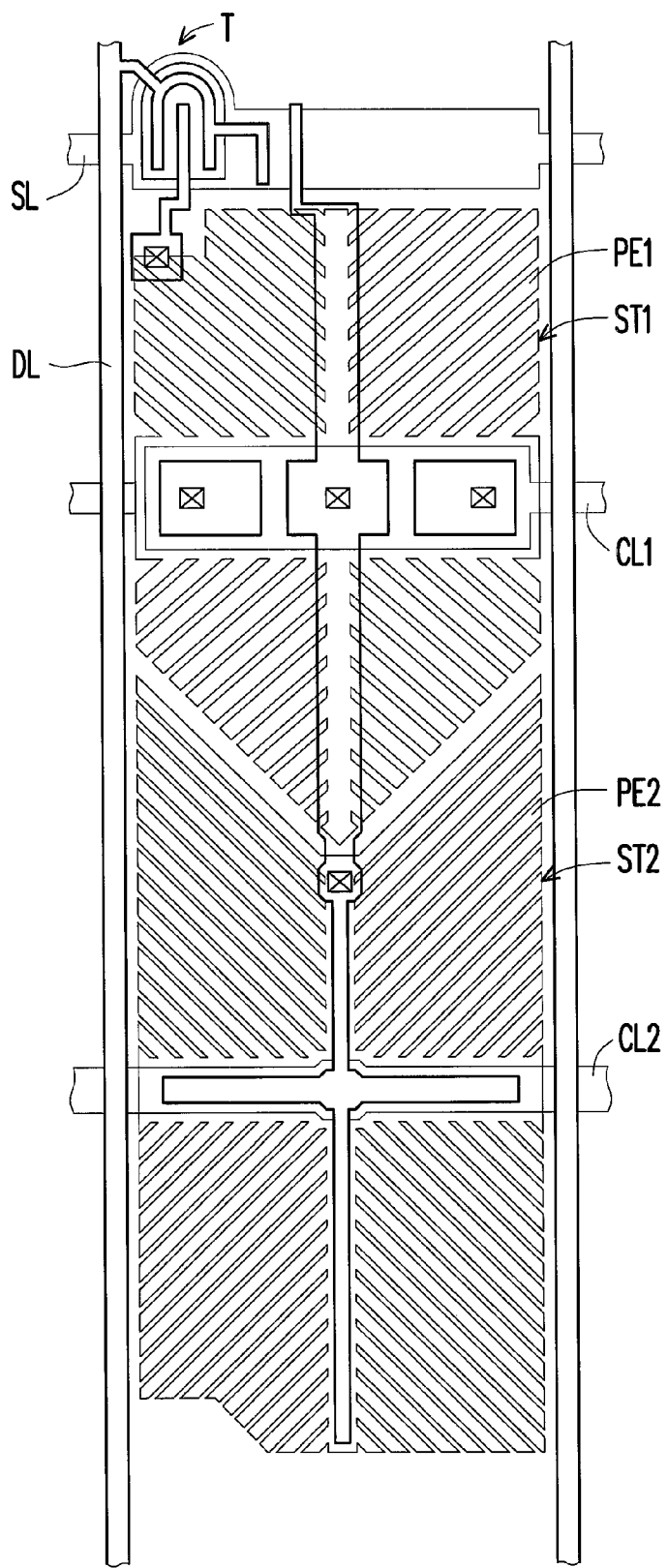
FIG. 11 is a schematic diagram of a pixel unit in a pixel array according to an embodiment of the invention.

It should be noticed that in the invention, the pixel unit structure of the main pixel region M and the sub pixel region S is not limited to the layout structure shown in FIG. 2. Actually, the pixel unit having the main pixel region M and the sub pixel region S may have a pixel unit structure as that shown in FIG. 11, which is driven by an active device T, the scan line SL and the data line DL. Certainly, besides the pixel unit structures shown in FIG. 2 and FIG. 11, the other layout methods and structures of the pixel unit having the main pixel region M and the sub pixel region S can also be used to resolve the color shift problem of the display panel. In order to describe the invention in detail, the pixel unit structure of FIG. 2 is taken as an example for descriptions, though the invention is not limited thereto.

In the present embodiment, as shown in FIG. 3, the first pixel electrode PE1 of the main pixel region M and the second pixel electrode PE2 of the sub pixel region S in each of the first color pixel unit Pa, the second color pixel unit Pb and the third color pixel unit Pc are specially designed. In order to describe the embodiment in detail, FIG. 3 only illustrates relations of included angles between the extending directions D1 and D2 of the slits of the pixel electrodes in the main pixel regions M and the sub pixel region S and the extending direction D of the scan line of the first color pixel unit Pa, the second color pixel unit Pb and the third color pixel unit Pc. The first color pixel unit Pa, the second color pixel unit Pb and the third color pixel unit Pc respectively have the structure as that shown in FIG. 2.

Referring to FIG. 2 and FIG. 3, a first acute angle in the main pixel region M of the first color pixel unit Pa is $\theta_{a-1}$, a second acute angle in the sub pixel region S of the first color pixel unit Pa is $\theta_{a-2}$. In other words, in the first color pixel unit Pa, the first acute angle formed between the extending direction D1 of the first slit ST1 of the first pixel electrode PE1 in the main pixel region M and the extending direction D of the scan line SL is $\theta_{a-1}$, and the second acute angle formed between the extending direction D2 of the second slit ST2 of the second pixel electrode PE2 in the sub pixel region S and the extending direction D of the scan line SL is $\theta_{a-2}$. A first acute angle in the main pixel region M of the second color pixel unit Pb is $\theta_{b-1}$, a second acute angle in the sub pixel region S of the second color pixel unit Pb is $\theta_{b-2}$. In other words, in the second color pixel unit Pb, the first acute angle formed between the extending direction D1 of the first slit ST1 of the first pixel electrode PE1 in the main pixel region M and the extending direction D of the scan line SL is $\theta_{b-1}$, and the second acute angle formed between the extending direction D2 of the second slit ST2 of the second pixel electrode PE2 in the sub pixel region S and the extending direction D of the scan line SL is $\theta_{b-2}$. A first acute angle in the main pixel region M of the third color pixel unit Pc is $\theta_{c-1}$, a second acute angle in the sub pixel region S of the third color pixel unit Pc is $\theta_{c-2}$. In other words, in the third color pixel unit Pc, the first acute angle formed between the extending direction D1 of the first slit ST1 of the first pixel electrode PE1 in the main pixel region M and the extending direction D of the scan line SL is $\theta_{c-1}$, and the second acute angle formed between the extending direction D2 of the second slit ST2 of the second pixel electrode PE2 in the sub pixel region S and the extending direction D of the scan line SL is $\theta_{c-2}$.

Here, any two of the first acute angle $\theta_{a-1}$ of the first color pixel unit Pa, the first acute angle $\theta_{b-1}$ of the second color pixel unit Pb, and the first acute angle $\theta_{c-1}$ of the third color pixel unit Pc are different. In the present embodiment, the first acute angle $\theta_{a-1}$ of the first color pixel unit Pa and the first acute angle $\theta_{b-1}$ of the second color pixel unit Pb are the same, and the first acute angle $\theta_{c-1}$ of the third color pixel unit Pc is different to the first acute angles $\theta_{a-1}$ and $\theta_{b-1}$ of the first and the second color pixel units Pa and Pb. Moreover, any two of the second acute angle $\theta_{a-2}$ of the first color pixel unit Pa, the second acute angle $\theta_{b-2}$ of the second color pixel unit Pb, and the second acute angle $\theta_{c-2}$ of the third color pixel unit Pc are different. In the present embodiment, the second acute angle $\theta_{a-2}$ of the first color pixel unit Pa and the second acute angle $\theta_{b-2}$ of the second color pixel unit Pb are the same, and the second acute angle $\theta_{c-2}$ of the third color pixel unit Pc is different to the second acute angles $\theta_{a-2}$ and $\theta_{b-2}$ of the first and the second color pixel units Pa and Pb.

In detail, a relationship of the first acute angle $\theta_{a-1}$ of the first color pixel unit Pa, the first acute angle $\theta_{b-1}$ of the second color pixel unit Pb, and the first acute angle $\theta_{c-1}$ of the third color pixel unit Pc is as follows:

$$0° < \theta_{a-1} - \theta_{c-1} \leq 10°$$

$$0° < \theta_{b-1} - \theta_{c-1} \leq 10°$$

The second acute angle $\theta_{a-2}$ of the first color pixel unit Pa, the second acute angle $\theta_{b-2}$ of the second color pixel unit Pb, and the second acute angle $\theta_{c-2}$ of the third color pixel unit Pc is as follows:

$$-10° \leq \theta_{a-2} - \theta_{c-2} < 0°$$

$$-10° \leq \theta_{b-2} - \theta_{c-2} < 0°$$

For example, the first acute angle $\theta_{a-1}$ of the first color pixel unit (a red pixel unit) Pa and the first acute angle $\theta_{b-1}$ of the second color pixel unit (a green pixel unit) Pb are 45°, and the first acute angle $\theta_{c-1}$ of the third color pixel unit (a blue pixel unit) Pc is 40°. Moreover, the second acute angle $\theta_{a-2}$ of the first color pixel unit (the red pixel unit) Pa and the second acute angle $\theta_{b-2}$ of the second color pixel unit (the green pixel unit) Pb are 45°, and the second acute angle $\theta_{c-2}$ of the third color pixel unit (the blue pixel unit) Pc is 50°. When the first acute angles and the second acute angles of the first color pixel unit P, the second color pixel unit Pb and the third color pixel unit Pc are as that described above, a gray-level and color temperature relationship of the LCD panel is as that shown in FIG. 4A, and a gray-level and color shift relationship of the LCD panel is as that shown in FIG. 4B.

Figure 4A:
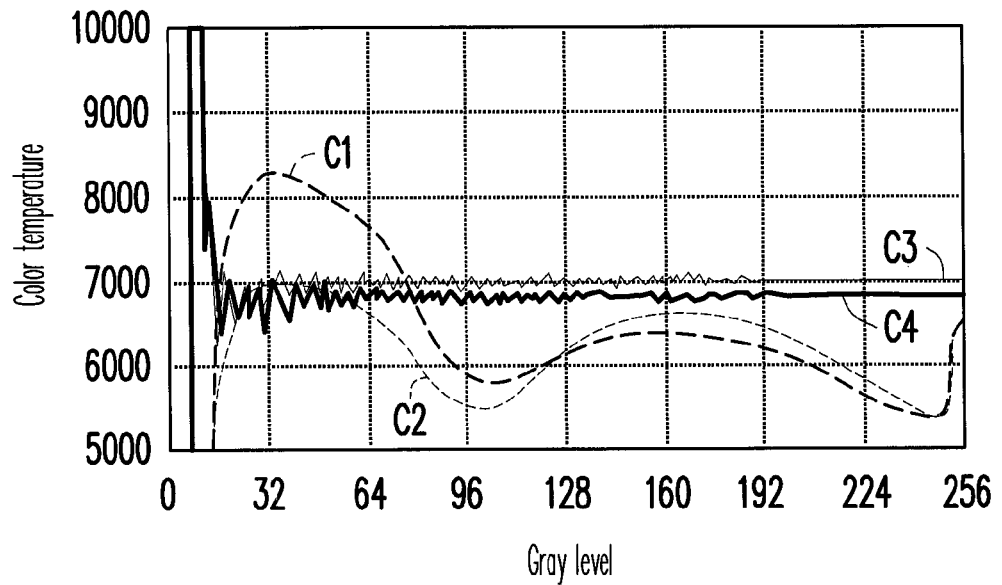
FIG. 4A is a gray-level and color temperature relationship diagram of the LCD panel according to an embodiment of the invention.
Figure 4B:
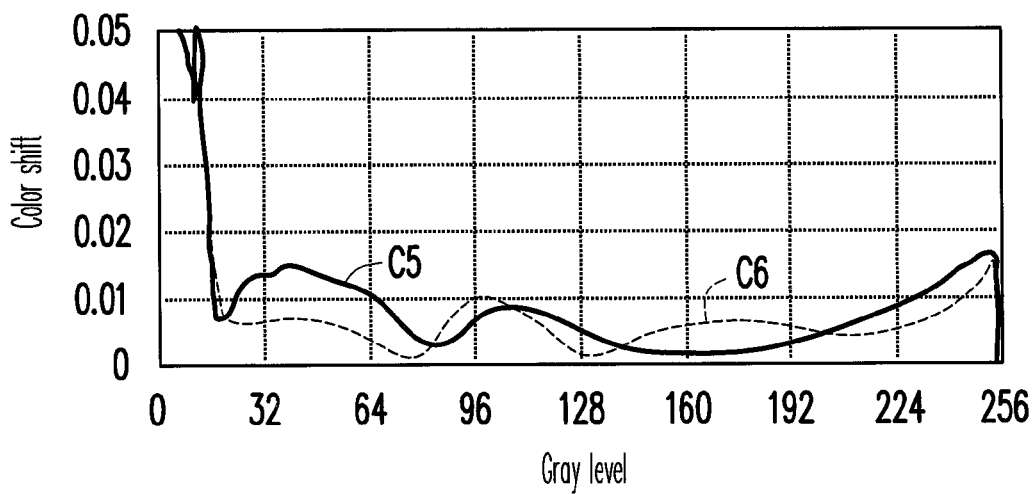
FIG. 4B is a gray-level and color shift relationship diagram of the LCD panel according to an embodiment of the invention.

In FIG. 4A, curve C1 represents a gray-level and color temperature relationship obtained when viewing the LCD having the conventional pixel array from a 45° viewing angle. Curve C2 represents a gray-level and color temperature relationship obtained when viewing the LCD having the pixel array of the present embodiment from the 45° viewing angle. Curve C3 represents a gray-level and color temperature relationship obtained when viewing the LCD having the conventional pixel array from a 0° viewing angle. Curve C4 represents a gray-level and color temperature relationship obtained when viewing the LCD having the pixel array of the present embodiment from the 0° viewing angle. In FIG. 4B, curve C5 represents a gray-level and color shift relationship obtained when viewing the LCD having the conventional pixel array from the 45° viewing angle. Curve C6 represents a gray-level and color shift relationship obtained when viewing the LCD having the pixel array of the present embodiment from the 45° viewing angle.

According to FIG. 4A and FIG. 4B, it is known that by designing the first acute angle $\theta_{c\text{-}1}$ and the second acute angle $\theta_{c\text{-}2}$ of the third color pixel unit (the blue pixel unit) Pc to be different to the first acute angles $\theta_{a\text{-}1}$, $\theta_{b\text{-}1}$ and the second acute angles $\theta_{a\text{-}2}$, $\theta_{b\text{-}2}$ of the first color pixel unit (the red pixel unit) Pa and the second color pixel unit (the green pixel unit) Pb, the color shift problem of the side view image can be indeed mitigated compared to the conventional pixel array design.

Second Embodiment

Figure 5A:
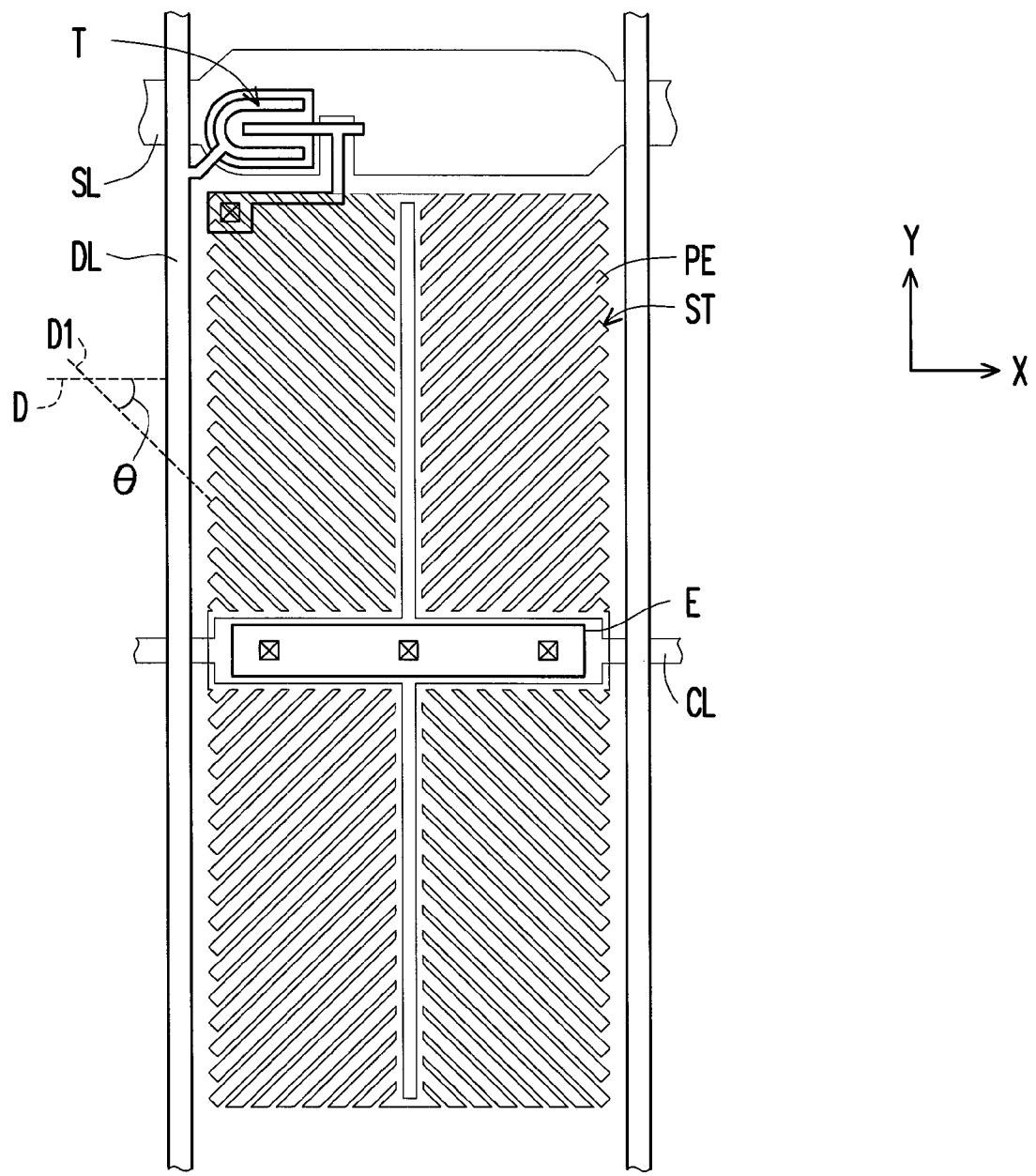
FIG. 5A is a schematic diagram of a pixel unit in a pixel array according to an embodiment of the invention.
Figure 5B:
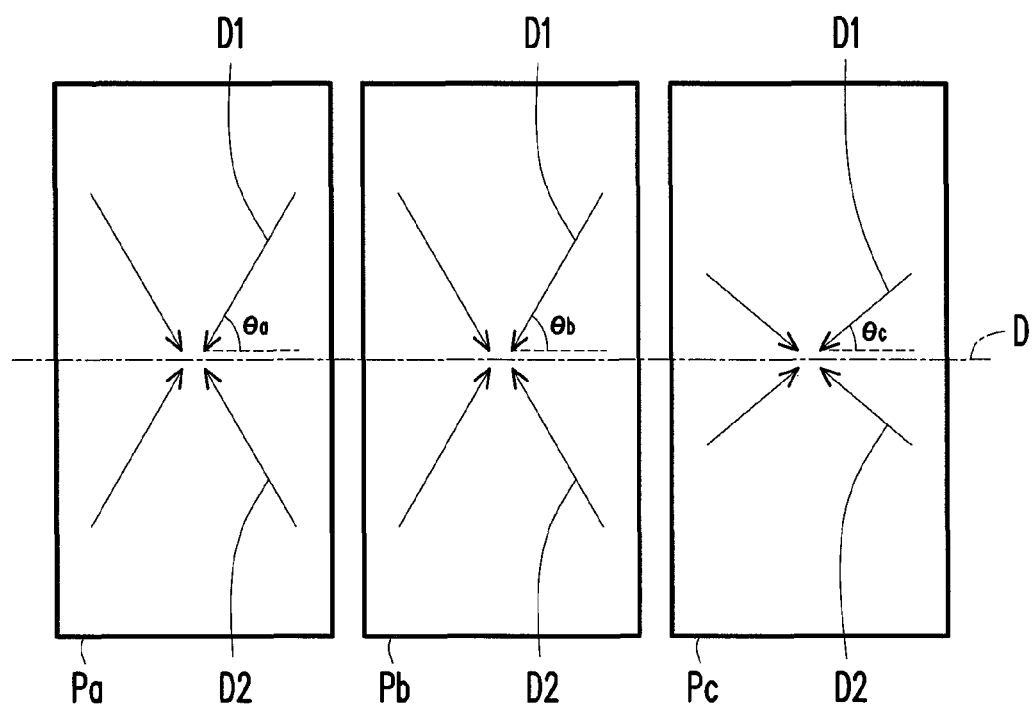
FIG. 5B is a schematic diagram of a pixel array according to an embodiment of the invention.

FIG. 5A is a schematic diagram of a pixel unit in a pixel array according to an embodiment of the invention. FIG. 5B is a schematic diagram of a pixel array according to an embodiment of the invention. A pixel unit structure of the present embodiment is similar to the pixel unit structure of FIG. 2, so that the same or similar devices are represented by the same or similar symbols, and details thereof are not repeated. Referring to FIG. 5A and FIG. 5B, structures of the first, the second and the third color pixel units Pa, Pb and Pc of the present embodiment are as that shown in FIG. 5A, which includes a scan line SL, a data line DL, an active device T and a pixel electrode PE.

Here, the scan line SL is intersected to the data line DL. The active device T can be a bottom gate type thin film transistor or a top gate type thin film transistor, which includes a gate, a channel, a source and a drain. The active device T is electrically connected to the scan line SL and the data line DL. The pixel electrode PE is electrically connected to the active device T. Particularly, the pixel electrode PE has at least one slit ST, and an acute angle θ is formed between an extending direction D1 of the slit ST and the extending direction D of the scan line SL.

In the present embodiment, the slits ST1 of the pixel electrode PE extend along four directions, such that the pixel electrode PE has four domain regions. Although only one extending direction of the slit ST is indicated in FIG. 5A, the four extending directions of the slits ST respectively form the acute angle θ with the extending direction D of the scan line SL.

In the present embodiment, the pixel electrode PE of the first color pixel unit Pa, the second color pixel unit Pb and the third color pixel unit Pc has a special design as that shown in FIG. 5B. In order to describe the present embodiment in detail, FIG. 5B only illustrates relations of included angles between the extending direction D1 of the slits of the pixel electrodes and the extending direction D of the scan line of the first color pixel unit Pa, the second color pixel unit Pb and the third color pixel unit Pc. The first color pixel unit Pa, the second color pixel unit Pb and the third color pixel unit Pc respectively have the structure as that shown in FIG. 5A.

Referring to FIG. 5A and FIG. 5B, an acute angle in the first color pixel unit Pa is $\theta_a$. In other words, in the first color pixel unit Pa, the acute angle $\theta_a$ is formed between the extending direction D1 of the slit ST of the pixel electrode PE and the extending direction D of the scan line SL. An acute angle $\theta_b$ is formed in the second color pixel unit Pb. In other words, in the second color pixel unit Pb, the acute angle $\theta_b$ is formed between the extending direction D1 of the slit ST of the pixel electrode PE and the extending direction D of the scan line SL. An acute angle $\theta_c$ is in the third color pixel unit Pc.

In other words, in the third color pixel unit Pc, the acute angle $\theta_c$ is formed between the extending direction D1 of the slit ST of the pixel electrode PE and the extending direction D of the scan line SL. Here, any two of the acute angle $\theta_a$ of the first color pixel unit Pa, the acute angle $\theta_b$ of the second color pixel unit Pb, and the acute angle $\theta_c$ of the third color pixel unit Pc are different. In the present embodiment, the acute angle $\theta_a$ of the first color pixel unit Pa and the acute angle $\theta_b$ of the second color pixel unit Pb are the same, and the acute angle $\theta_c$ of the third color pixel unit Pc is different to the acute angles $\theta_a$ and $\theta_b$ of the first and the second color pixel units Pa and Pb. In detail, a relationship of the acute angle $\theta_a$ of the first color pixel unit Pa, the acute angle $\theta_b$ of the second color pixel unit Pb, and the acute angle $\theta_c$ of the third color pixel unit Pc is as follows:

$$0° < \theta_a - \theta_c \leq 10°$$

$$0° < \theta_b - \theta_c \leq 10°$$

For example, the acute angle $\theta_a$ of the first color pixel unit (the red pixel unit) Pa and the acute angle $\theta_b$ of the second color pixel unit (the green pixel unit) Pb are 45°, and the acute angle $\theta_c$ of the third color pixel unit (the blue pixel unit) Pc is 40°, though the invention is not limited thereto. When the acute angles of the first color pixel unit P, the second color pixel unit Pb and the third color pixel unit Pc are as that described above, a gray-level and color temperature relationship of the LCD panel is as that shown in FIG. 6A, and a gray-level and color shift relationship of the LCD panel is as that shown in FIG. 6B.

Figure 6A:
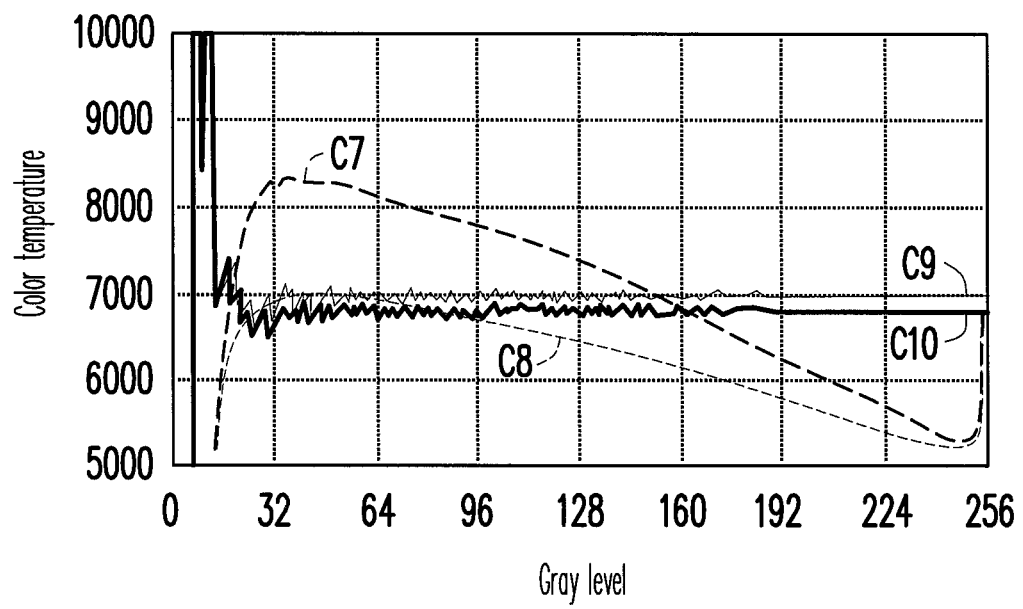
FIG. 6A is a gray-level and color temperature relationship diagram of the LCD panel according to an embodiment of the invention.
Figure 6B:
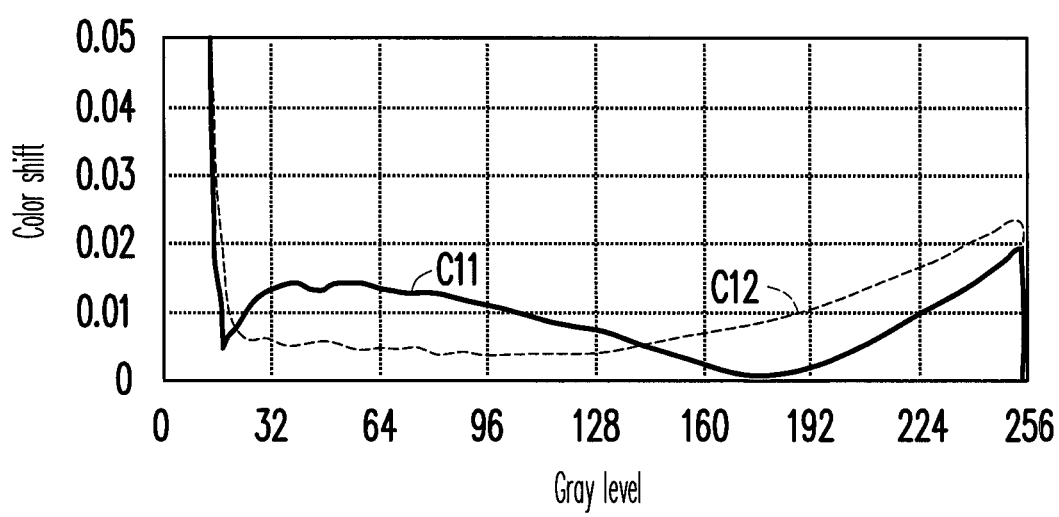
FIG. 6B is a gray-level and color shift relationship diagram of the LCD panel according to an embodiment of the invention.

In FIG. 6A, curve C7 represents a gray-level and color temperature relationship obtained when viewing the LCD having the conventional pixel array from a 45° viewing angle. Curve C8 represents a gray-level and color temperature relationship obtained when viewing the LCD having the pixel array of the present embodiment from the 45° viewing angle. Curve C9 represents a gray-level and color temperature relationship obtained when viewing the LCD having the conventional pixel array from a 0° viewing angle. Curve C10 represents a gray-level and color temperature relationship obtained when viewing the LCD having the pixel array of the present embodiment from the 0° viewing angle. In FIG. 6B, curve C11 represents a gray-level and color shift relationship obtained when viewing the LCD having the conventional pixel array from the 45° viewing angle. Curve C12 represents a gray-level and color shift relationship obtained when viewing the LCD having the pixel array of the present embodiment from the 45° viewing angle.

According to FIG. 6A and FIG. 6B, it is known that by designing the acute angle $\theta_c$ of the third color pixel unit (the blue pixel unit) Pc to be different to the acute angles $\theta_a$, and $\theta_b$ of the first color pixel unit (the red pixel unit) Pa and the second color pixel unit (the green pixel unit) Pb, the color shift problem of the side view image can be indeed mitigated compared to the conventional pixel array design.

Third Embodiment

Figure 7:
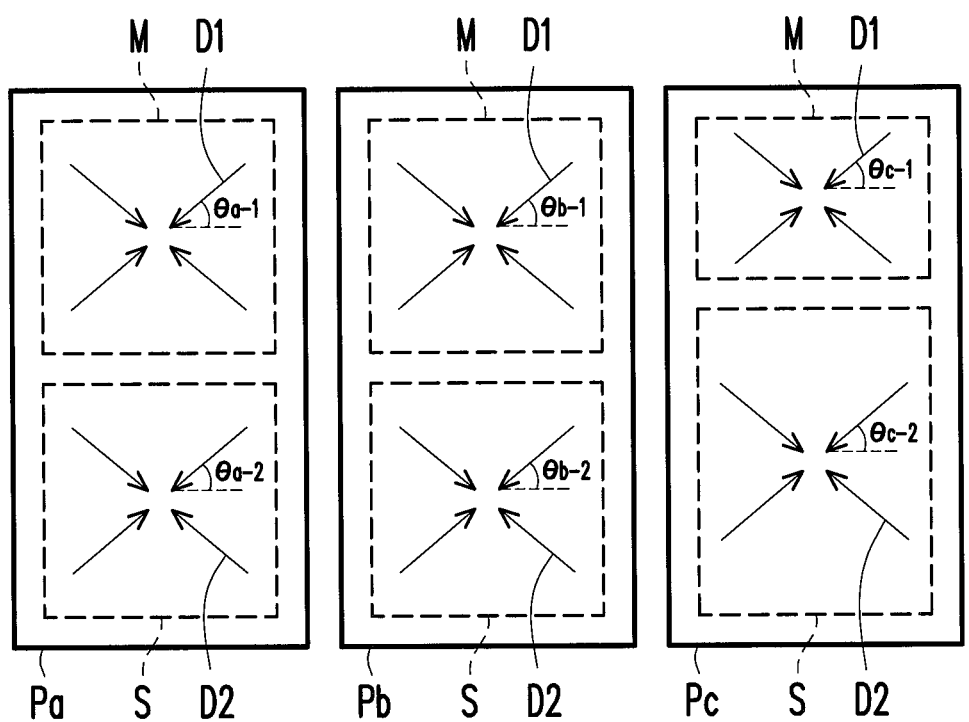
FIG. 7 is a schematic diagram of a pixel array according to an embodiment of the invention.

FIG. 7 is a schematic diagram of a pixel array according to an embodiment of the invention. Referring to FIG. 7, the pixel array of FIG. 7 is similar to the pixel array of FIG. 3, so that the same or similar devices are represented by the same or similar symbols, and details thereof are not repeated. In the present embodiment, the pixel array includes the first, the second and the third color pixel units Pa, Pb, Pc, and structures thereof are as that shown in FIG. 2, so that the first, the second and the third color pixel units Pa, Pb, Pc respectively have the main pixel region M and the sub pixel region S.

A difference between the pixel array of the present embodiment and the pixel array of FIG. 3 is that the first acute angles $\theta_{a-1}$, $\theta_{b-1}$, $\theta_{c-1}$ and the second acute angles $\theta_{a-2}$, $\theta_{b-2}$, $\theta_{c-2}$ of the first color pixel unit Pa, the second color pixel unit Pb and the third color pixel unit Pc are all the same. However, area ratios and voltage ratios of the first pixel electrode PE1 (the main pixel region M) and the second pixel electrode PE2 (the sub pixel region S) in the first color pixel unit Pa, the second color pixel unit Pb and the third color pixel unit Pc are different.

In the present embodiment, an area of the first pixel electrode PE1 (the main pixel region M) of the first color pixel unit Pa is $A_{a-1}$, and an area of the second pixel electrode PE2 (the sub pixel region S) is $A_{a-2}$, so that an area ratio of the first pixel electrode PE1 (the main pixel region M) and the second pixel electrode PE2 (the sub pixel region S) of the first color pixel unit Pa is $A_{a-1}/A_{a-2}$. An area of the first pixel electrode PE1 (the main pixel region M) of the second color pixel unit Pb is $A_{b-1}$, and an area of the second pixel electrode PE2 (the sub pixel region S) is $A_{b-2}$, so that an area ratio of the first pixel electrode PE1 (the main pixel region M) and the second pixel electrode PE2 (the sub pixel region S) of the second color pixel unit Pb is $A_{b-1}/A_{b-2}$. An area of the first pixel electrode PE1 (the main pixel region M) of the third color pixel unit Pc is $A_{c-1}$, and an area of the second pixel electrode PE2 (the sub pixel region S) is $A_{c-2}$, so that an area ratio of the first pixel electrode PE1 (the main pixel region M) and the second pixel electrode PE2 (the sub pixel region S) of the third color pixel unit Pc is $A_{c-1}/A_{c-2}$. Here, any two of the area ratio ($A_{a-1}/A_{a-2}$), the area ratio ($A_{b-1}/A_{b-2}$) and the area ratio ($A_{c-1}/A_{c-2}$) are different. In the present embodiment, the area ratio ($A_{a-1}/A_{a-2}$) of the first pixel electrode PE1 (the main pixel region M) and the second pixel electrode PE2 (the sub pixel region S) of the first color pixel unit Pa is the same to the area ratio ($A_{b-1}/A_{b-2}$) of the first pixel electrode PE1 (the main pixel region M) and the second pixel electrode PE2 (the sub pixel region S) of the second color pixel unit Pb, and the area ratio ($A_{c-1}/A_{c-2}$) of the first pixel electrode PE1 (the main pixel region M) and the second pixel electrode PE2 (the sub pixel region S) of the third color pixel unit Pc is different to the area ratios ($A_{a-1}/A_{a-2}$) and ($A_{b-1}/A_{b-2}$) of the first pixel electrodes PE1 (the main pixel region M) and the second pixel electrodes PE2 (the sub pixel region S) of the first color pixel unit Pa and the second color pixel unit Pb.

In detail, a relationship of the area ratio ($A_{a-1}/A_{a-2}$) of the first pixel electrode and the second pixel electrode of the first color pixel unit Pa, the area ratio ($A_{b-1}/A_{b-2}$) of the first pixel electrode and the second pixel electrode of the second color pixel unit Pb, and the area ratio ($A_{c-1}/A_{c-2}$) of the first pixel electrode and the second pixel electrode of the third color pixel unit Pc is as follows.

$$-25\% \leq [(A_{c-1}/A_{c-2})-(A_{a-1}/A_{a-2})]/(A_{a-1}/A_{a-2}) < 0$$

$$-25\% \leq [(A_{c-1}/A_{c-2})-(A_{b-1}/A_{b-2})]/(A_{b-1}/A_{b-2}) < 0$$

For example, the area ratio ($A_{a-1}/A_{a-2}$) of the first pixel electrode and the second pixel electrode of the first color pixel unit (for example, the red pixel unit) Pa is 4/6, the area ratio ($A_{b-1}/A_{b-2}$) of the first pixel electrode and the second pixel electrode of the second color pixel unit (for example, the green pixel unit) Pb is 4/6, and the area ratio ($A_{c-1}/A_{c-2}$) of the first pixel electrode and the second pixel electrode of the third color pixel unit (for example, the blue pixel unit) Pc is 1/2.

Moreover, in the present embodiment, a voltage of the first pixel electrode PE1 of the first color pixel unit Pa is $V_{a-1}$, and a voltage of the second pixel electrode PE2 is $V_{a-2}$, so that a voltage ratio of the second pixel electrode PE2 and the first pixel electrode PE1 of the first color pixel unit Pa is $V_{a-2}/V_{a-1}$. A voltage of the first pixel electrode PE1 of the second color pixel unit Pb is $V_{b-1}$, and a voltage of the second pixel electrode PE2 is $V_{b-2}$, so that a voltage ratio of the second pixel electrode PE2 and the first pixel electrode PE1 of the second color pixel unit Pb is $V_{b-2}/V_{b-1}$. A voltage of the first pixel electrode PE1 of the third color pixel unit Pc is $V_{c-1}$, and a voltage of the second pixel electrode PE2 is $V_{c-2}$, so that a voltage ratio of the second pixel electrode PE2 and the first pixel electrode PE1 of the third color pixel unit Pc is $V_{c-2}/V_{c-1}$. Here, any two of the voltage ratio ($V_{a-2}/V_{a-1}$), the voltage ratio ($V_{b-2}/V_{b-1}$) and the voltage ratio ($V_{c-2}/V_{c-1}$) are different. In the present embodiment, the voltage ratio ($V_{a-2}/V_{a-1}$) of the second pixel electrode PE2 and the first pixel electrode PE1 of the first color pixel unit Pa is the same to the voltage ratio ($V_{b-2}/V_{b-1}$) of the second pixel electrode PE2 and the first pixel electrode PE1 of the second color pixel unit Pb, and the voltage ratio ($V_{c-2}/V_{c-1}$) of the second pixel electrode PE2 and the first pixel electrode PE1 of the third color pixel unit Pc is different to the voltage ratios ($V_{a-2}/V_{a-1}$) and ($V_{b-2}/V_{b-1}$) of the second pixel electrodes PE2 and the first pixel electrodes PE1 of the first color pixel unit Pa and the second color pixel unit Pb.

In detail, a relationship of the voltage ratio ($V_{a-2}/V_{a-1}$) of the second pixel electrode PE2 and the first pixel electrode PE1 of the first color pixel unit Pa, the voltage ratio ($V_{b-2}/V_{b-1}$) of the second pixel electrode PE2 and the first pixel electrode PE1 of the second color pixel unit Pb, and the voltage ratio ($V_{c-2}/V_{c-1}$) of the second pixel electrode PE2 and the first pixel electrode PE1 of the third color pixel unit Pc is as follows.

$$0 < [(V_{c-2}/V_{c-1})-(V_{a-2}/V_{a-1})]/(V_{a-2}/V_{a-1}) \leq 10\%$$

$$0 < [(V_{c-2}/V_{c-1})-(V_{b-2}/V_{b-1})]/(V_{b-2}/V_{b-1}) \leq 10\%$$

For example, the voltage ratio ($V_{a-2}/V_{a-1}$) of the second pixel electrode PE2 and the first pixel electrode PE1 of the first color pixel unit Pa is 2.1/2.85, the voltage ratio ($V_{b-2}/V_{b-1}$) of the second pixel electrode PE2 and the first pixel electrode PE1 of the second color pixel unit Pb is 2.1/2.85, and the voltage ratio ($V_{c-2}/V_{c-1}$) of the second pixel electrode PE2 and the first pixel electrode PE1 of the third color pixel unit Pc is 2.2/2.85.

Figure 8A:
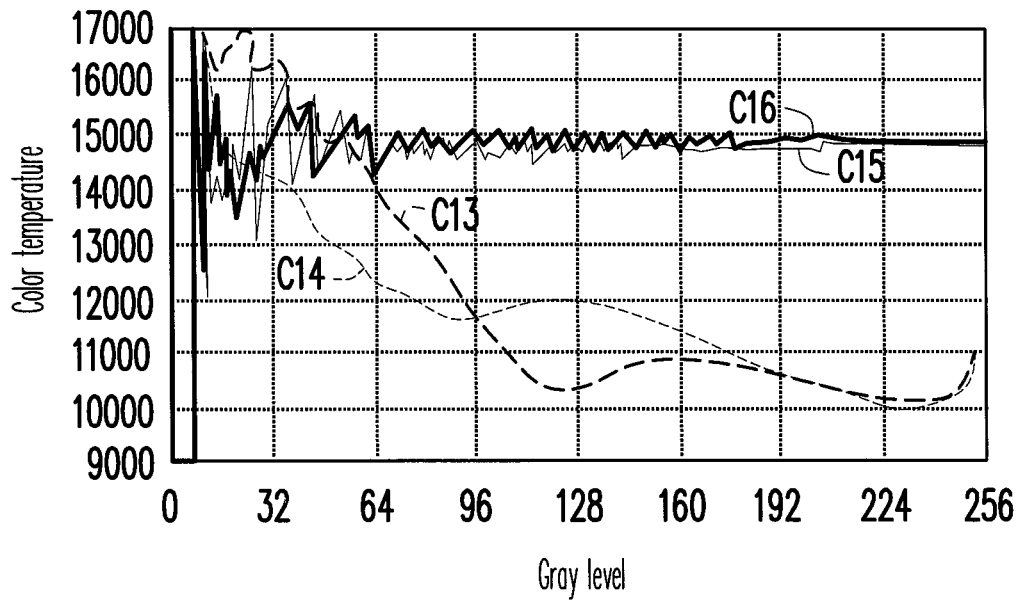
FIG. 8A is a gray-level and color temperature relationship diagram of the LCD panel according to an embodiment of the invention.
Figure 8B:
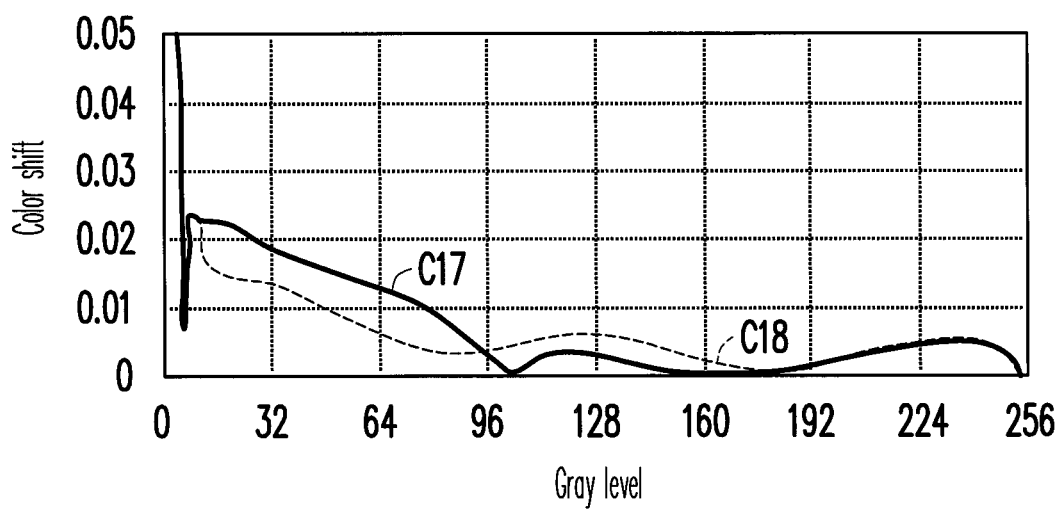
FIG. 8B is a gray-level and color shift relationship diagram of the LCD panel according to an embodiment of the invention.

When the first acute angles and the second acute angles, the area ratios and the voltage ratios of the first color pixel unit Pa, the second color pixel unit Pb and the third color pixel unit Pc are as that described above, a gray-level and color temperature relationship of the LCD panel is as that shown in FIG. 8A, and a gray-level and color shift relationship of the LCD panel is as that shown in FIG. 8B.

In FIG. 8A, curve C13 represents a gray-level and color temperature relationship obtained when viewing the LCD having the conventional pixel array from a 45° viewing angle. Curve C14 represents a gray-level and color temperature relationship obtained when viewing the LCD having the pixel array of the present embodiment from the 45° viewing angle. Curve C15 represents a gray-level and color temperature relationship obtained when viewing the LCD having the conventional pixel array from a 0° viewing angle. Curve C16 represents a gray-level and color temperature relationship obtained when viewing the LCD having the pixel array of the present embodiment from the 0° viewing angle. In FIG. 8B, curve C17 represents a gray-level and color shift relationship obtained when viewing the LCD having the conventional pixel array from the 45° viewing angle. Curve C18 represents a gray-level and color shift relationship obtained when viewing the LCD having the pixel array of the present embodiment from the 45° viewing angle.

According to FIG. 8A and FIG. 8B, it is known that by designing the area ratio ($A_{c-1}/A_{c-2}$) and the voltage ratio ($V_{c-2}/V_{c-1}$) of the third color pixel unit (the blue pixel unit) Pc to be different to the area ratios ($A_{a-1}/A_{a-2}$, $A_{b-1}/A_{b-2}$) and the voltage ratios ($V_{a-2}/V_{a-1}$, $V_{b-2}/V_{b-1}$) of the first color pixel unit (the red pixel unit) Pa and the second color pixel unit (the green pixel unit) Pb, the color shift problem of the side view image can be indeed mitigated compared to the conventional pixel array design.

Fourth Embodiment

Figure 9:
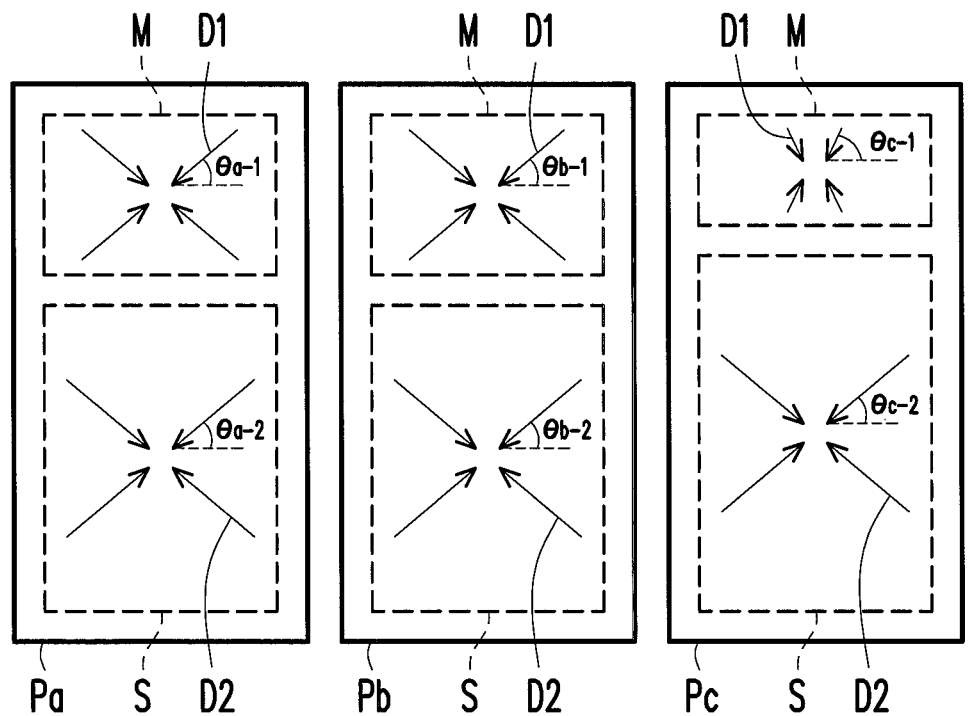
FIG. 9 is a schematic diagram of a pixel array according to an embodiment of the invention.

FIG. 9 is a schematic diagram of a pixel array according to an embodiment of the invention. Referring to FIG. 9, the pixel array of FIG. 9 is similar to the pixel array of FIG. 3, so that the same or similar devices are represented by the same or similar symbols, and details thereof are not repeated. In the present embodiment, the pixel array includes the first, the second and the third color pixel units Pa, Pb, Pc, and structures thereof are as that shown in FIG. 2, so that the first, the second and the third color pixel units Pa, Pb, Pc respectively have the main pixel region M and the sub pixel region S.

A difference between the pixel array of the present embodiment and the pixel array of FIG. 3 is that the first acute angles $\theta_{a-1}$, $\theta_{b-1}$, $\theta_{c-1}$ and the second acute angles $\theta_{a-2}$, $\theta_{b-2}$, $\theta_{c-2}$ of the first color pixel unit Pa, the second color pixel unit Pb and the third color pixel unit Pc are slightly different, and area ratios of the first pixel electrodes PE1 (the main pixel region M) and the second pixel electrodes PE2 (the sub pixel region S) in the first color pixel unit Pa, the second color pixel unit Pb and the third color pixel unit Pc are also different.

Here, any two of the first acute angle $\theta_{a-1}$ in the main pixel region M of the first color pixel unit Pa, the first acute angle $\theta_{b-1}$ in the main pixel region M of the second color pixel unit Pb, and the first acute angle $\theta_{c-1}$ in the main pixel region M of the third color pixel unit Pc are different. In the present embodiment, the first acute angle $\theta_{a-1}$ in the main pixel region M of the first color pixel unit Pa and the first acute angle $\theta_{b-1}$ in the main pixel region M of the second color pixel unit Pb are the same, and the first acute angle $\theta_{c-1}$ in the main pixel region M of the third color pixel unit Pc is different to the first acute angles $\theta_{a-1}$ and $\theta_{b-1}$ in the main pixel regions M of the first and the second color pixel units Pa and Pb.

In detail, a relationship of the first acute angle $\theta_{a-1}$ of the first color pixel unit Pa, the first acute angle $\theta_{b-1}$ of the second color pixel unit Pb, and the first acute angle $\theta_{c-1}$ of the third color pixel unit Pc is as follows:

$$-10°\leq\theta_{a-1}-\theta_{c-1}<0°$$

$$-10°\leq\theta_{b-1}-\theta_{c-1}<0°$$

Moreover, the second acute angle $\theta_{a-2}$ in the sub pixel region S of the first color pixel unit Pa, the second acute angle $\theta_{b-2}$ in the sub pixel region S of the second color pixel unit Pb, and the second acute angle $\theta_{c-2}$ in the sub pixel region S of the third color pixel unit Pc are the same.

For example, the first acute angle $\theta_{a-1}$ of the first color pixel unit (the red pixel unit) Pa and the first acute angle $\theta_{b-1}$ of the second color pixel unit (the green pixel unit) Pb are 45°, and the first acute angle $\theta_{c-1}$ of the third color pixel unit (the blue pixel unit) Pc is 50°, though the invention is not limited thereto. Moreover, the second acute angle $\theta_{a-2}$ of the first color pixel unit (the red pixel unit) Pa, the second acute angle $\theta_{b-2}$ of the second color pixel unit (the green pixel unit) Pb and the second acute angle $\theta_{c-2}$ of the third color pixel unit (the blue pixel unit) Pc are all 45°, though the invention is not limited thereto.

Moreover, in the present embodiment, an area ratio of the first pixel electrode PE1 (the main pixel region M) and the second pixel electrode PE2 (the sub pixel region S) of the first color pixel unit Pa is $A_{a-1}/A_{a-2}$. An area ratio of the first pixel electrode PE1 (the main pixel region M) and the second pixel electrode PE2 (the sub pixel region S) of the second color pixel unit Pb is $A_{b-1}/A_{b-2}$. An area ratio of the first pixel electrode PE1 (the main pixel region M) and the second pixel electrode PE2 (the sub pixel region S) of the third color pixel unit Pc is $A_{c-1}/A_{c-2}$. Here, any two of the area ratio ($A_{a-1}/A_{a-2}$), the area ratio ($A_{b-1}/A_{b-2}$) and the area ratio ($A_{c-1}/A_{c-2}$) are different. In the present embodiment, the area ratio ($A_{a-1}/A_{a-2}$) of the first pixel electrode PE1 (the main pixel region M) and the second pixel electrode PE2 (the sub pixel region S) of the first color pixel unit Pa is the same to the area ratio ($A_{b-1}/A_{b-2}$) of the first pixel electrode PE1 (the main pixel region M) and the second pixel electrode PE2 (the sub pixel region S) of the second color pixel unit Pb, and the area ratio ($A_{c-1}/A_{c-2}$) of the first pixel electrode PE1 (the main pixel region M) and the second pixel electrode PE2 (the sub pixel region S) of the third color pixel unit Pc is different to the area ratios ($A_{a-1}/A_{a-2}$) and ($A_{b-1}/A_{b-2}$) of the first pixel electrodes PE1 (the main pixel region M) and the second pixel electrodes PE2 (the sub pixel region S) of the first color pixel unit Pa and the second color pixel unit Pb.

In detail, a relationship of the area ratio ($A_{a-1}/A_{a-2}$) of the first pixel electrode and the second pixel electrode of the first color pixel unit Pa, the area ratio ($A_{b-1}/A_{b-2}$) of the first pixel electrode and the second pixel electrode of the second color pixel unit Pb, and the area ratio ($A_{c-1}/A_{c-2}$) of the first pixel electrode and the second pixel electrode of the third color pixel unit Pc is as follows.

$$-25\%\leq[(A_{c-1}/A_{c-2})-(A_{a-1}/A_{a-2})]/(A_{a-1}/A_{a-2})<0$$

$$-25\%\leq[(A_{c-1}/A_{c-2})-(A_{b-1}/A_{b-2})]/(A_{b-1}/A_{b-2})<0$$

For example, the area ratio ($A_{a-1}/A_{a-2}$) of the first pixel electrode and the second pixel electrode of the first color pixel unit (for example, the red pixel unit) Pa is 1/2, the area ratio ($A_{b-1}/A_{b-2}$) of the first pixel electrode and the second pixel electrode of the second color pixel unit (for example, the green pixel unit) Pb is 1/2, and the area ratio ($A_{c-1}/A_{c-2}$) of the first pixel electrode and the second pixel electrode of the third color pixel unit (for example, the blue pixel unit) Pc is 1/3. In the present embodiment, the area of the first pixel electrode PE1 (the main pixel region M) of the third color pixel unit Pc is smaller than the area of the first pixel electrode PE1 (the main pixel region M) of the first color pixel unit (for example, the red pixel unit) Pa and the area of the first pixel electrode PE1 (the main pixel region M) of the second color pixel unit (for example, the green pixel unit) Pb, and the area of the second pixel electrode PE2 (the sub pixel region S) of the third color pixel unit Pc is greater than the area of the second pixel electrode PE2 (the sub pixel region S) of the first color pixel unit (for example, the red pixel unit) Pa and the area of the second pixel electrode PE2 (the sub pixel region S) of the second color pixel unit (for example, the green pixel unit) Pb.

Figure 10A:
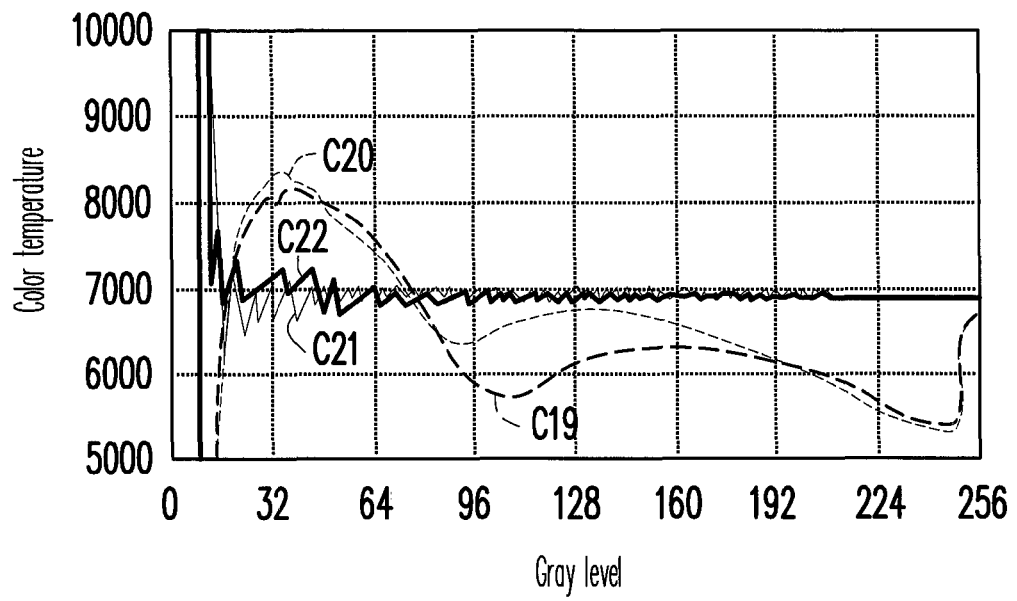
FIG. 10A is a gray-level and color temperature relationship diagram of the LCD panel according to an embodiment of the invention.
Figure 10B:
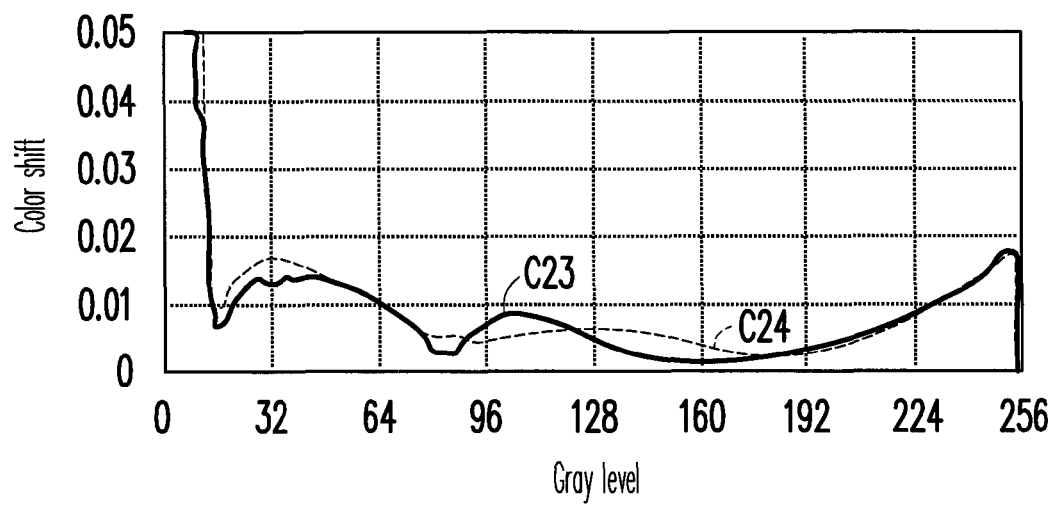
FIG. 10B is a gray-level and color shift relationship diagram of the LCD panel according to an embodiment of the invention.

When the first acute angles and the second acute angles and the area ratios of the first color pixel unit Pa, the second color pixel unit Pb and the third color pixel unit Pc are as that described above, a gray-level and color temperature relationship of the LCD panel is as that shown in FIG. 10A, and a gray-level and color shift relationship of the LCD panel is as that shown in FIG. 10B.

In FIG. 10A, curve C19 represents a gray-level and color temperature relationship obtained when viewing the LCD having the conventional pixel array from a 45° viewing angle. Curve C20 represents a gray-level and color temperature relationship obtained when viewing the LCD having the pixel array of the present embodiment from the 45° viewing angle. Curve C21 represents a gray-level and color temperature relationship obtained when viewing the LCD having the conventional pixel array from a 0° viewing angle. Curve C22 represents a gray-level and color temperature relationship obtained when viewing the LCD having the pixel array of the present embodiment from the 0° viewing angle. In FIG. 10B, curve C23 represents a gray-level and color shift relationship obtained when viewing the LCD having the conventional pixel array from the 45° viewing angle. Curve C24 represents a gray-level and color shift relationship obtained when viewing the LCD having the pixel array of the present embodiment from the 45° viewing angle.

According to FIG. 10A and FIG. 10B, it is known that by respectively designing the first acute angle $\theta_{c-1}$ and the area ratio ($A_{c-1}/A_{c-2}$) of the third color pixel unit (the blue pixel unit) Pc to be different to the first acute angles $\theta_{a-1}$ and $\theta_{b-1}$ and the area ratios ($A_{a-1}/A_{a-2}$, $A_{b-1}/A_{b-2}$) of the first color pixel unit (the red pixel unit) Pa and the second color pixel unit (the green pixel unit) Pb, the color shift problem of the side view image can be indeed mitigated compared to the conventional pixel array design.

Fifth Embodiment

Figure 12:
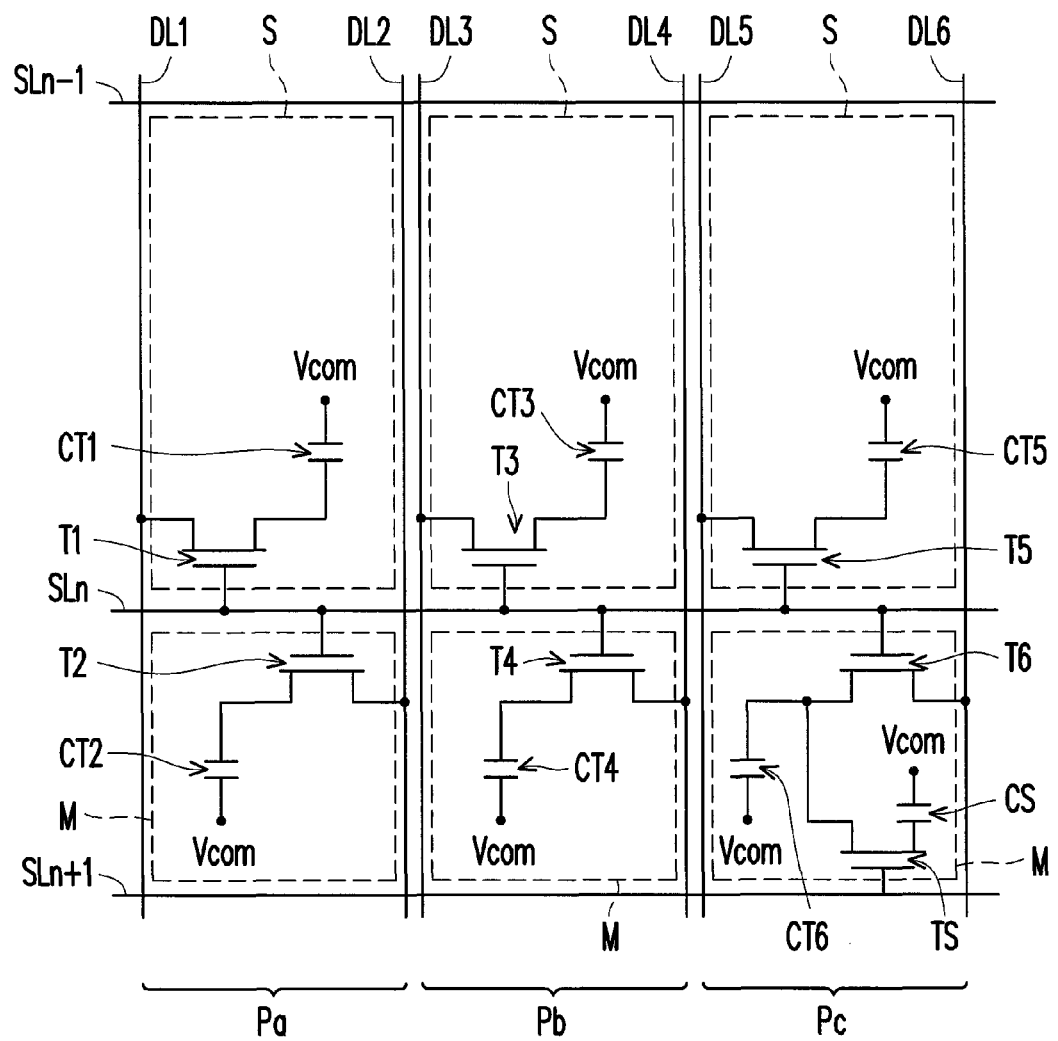
FIG. 12 is a schematic diagram of a pixel unit in a pixel array according to an embodiment of the invention.

FIG. 12 is a schematic diagram of a pixel unit in a pixel array according to an embodiment of the invention. Referring to FIG. 12, the pixel array of the present embodiment includes the first color pixel unit Pa, the second color pixel unit Pb and the third color pixel unit Pc. In the present embodiment, the first color pixel unit Pa, the second color pixel unit Pb and the third color pixel unit Pc are, for example, located in a same row of the pixel array, though the invention is not limited thereto. Similarly, the first color pixel unit Pa is disposed corresponding to the first color filter pattern of the color filter array, the second pixel unit Pb is disposed corresponding to the second color filter pattern of the color filter array, and the third pixel unit Pc is disposed corresponding to the third color filter pattern of the color filter array. Therefore, if the first color filter pattern, the second color filter pattern and the third color filter pattern are respectively a red filter pattern, a green filter pattern and a blue filter pattern, the first, the second and the third color pixel units Pa, Pb and Pc are respectively the red pixel unit Pa, the green pixel unit Pb and the blue pixel unit Pc.

In the present embodiment, the first color pixel unit Pa includes a scan line SLn, data lines DL1 and DL2, active devices T1 and T2, and storage capacitors CT1 and CT2, where the storage capacitor CT1 is composed of a second pixel electrode (not shown) and a second capacitor electrode line (not shown), and the storage capacitor CT2 is composed of a first pixel electrode (not shown) and a first capacitor electrode line (not shown). The active devices T1 and T2 can be bottom gate type thin film transistors or top gate type thin film transistors, which respectively include a gate, a channel, a source and a drain. The active device T1 is electrically connected to the scan line SLn and the data line DL1, and the active device T2 is electrically connected to the scan line SLn and the data line DL2. Moreover, one end (a second pixel electrode) of the storage capacitor CT1 is electrically connected to the active device T1, and another end thereof is electrically connected to a common voltage Vcom. One end (a first pixel electrode) of the storage capacitor CT2 is electrically connected to the active device T2, and another end thereof is electrically connected to the common voltage Vcom. In the present embodiment, a region where the second pixel electrode (i.e. one electrode of the storage capacitor CT1) locates is referred to as the sub pixel region S, and a region where the first pixel electrode (i.e. one electrode of the storage capacitor CT2) locates is referred to as the main pixel region M. It should be noticed that, a layout method of the second pixel electrode and the second capacitor electrode line that form the storage capacitor CT1 and a layout method of the first pixel electrode and the first capacitor electrode line that form the storage capacitor CT2 are as that shown in FIG. 2, though the invention is not limited thereto.

The second color pixel unit Pb includes a scan line SLn, data lines DL3 and DL4, active devices T3 and T4, and storage capacitors CT3 and CT4, where the storage capacitor CT3 is composed of a second pixel electrode (not shown) and a second capacitor electrode line (not shown), and the storage capacitor CT4 is composed of a first pixel electrode (not shown) and a first capacitor electrode line (not shown). The active devices T3 and T4 can be bottom gate type thin film transistors or top gate type thin film transistors, which respectively include a gate, a channel, a source and a drain. The active device T3 is electrically connected to the scan line SLn and the data line DL3, and the active device T4 is electrically connected to the scan line SLn and the data line DL4. Moreover, one end (a second pixel electrode) of the storage capacitor CT3 is electrically connected to the active device T3, and another end thereof is electrically connected to the common voltage Vcom. One end (a first pixel electrode) of the storage capacitor CT4 is electrically connected to the active device T4, and another end thereof is electrically connected to the common voltage Vcom. In the present embodiment, a region where the second pixel electrode (i.e. one electrode of the storage capacitor CT3) locates is referred to as the sub pixel region S, and a region where the first pixel electrode (i.e. one electrode of the storage capacitor CT4) locates is referred to as the main pixel region M. It should be noticed that, a layout method of the second pixel electrode and the second capacitor electrode line that form the storage capacitor CT3 and a layout method of the first pixel electrode and the first capacitor electrode line that form the storage capacitor CT4 are as that shown in FIG. 2, though the invention is not limited thereto.

The third color pixel unit Pc includes a scan line SLn, data lines DL5 and DL6, active devices T5 and T6, and storage capacitors CT5 and CT6, where the storage capacitor CT5 is composed of a second pixel electrode (not shown) and a second capacitor electrode line (not shown), and the storage capacitor CT6 is composed of a first pixel electrode (not shown) and a first capacitor electrode line (not shown). The active devices T5 and T6 can be bottom gate type thin film transistors or top gate type thin film transistors, which respectively include a gate, a channel, a source and a drain. The active device T5 is electrically connected to the scan line SLn and the data line DL5, and the active device T6 is electrically connected to the scan line SLn and the data line DL6. Moreover, one end (a second pixel electrode) of the storage capacitor CT5 is electrically connected to the active device T5, and another end thereof is electrically connected to the common voltage Vcom. One end (a first pixel electrode) of the storage capacitor CT6 is electrically connected to the active device T6, and another end thereof is electrically connected to the common voltage Vcom. In the present embodiment, a region where the second pixel electrode (i.e. one electrode of the storage capacitor CT5) locates is referred to as the sub pixel region S, and a region where the first pixel electrode (i.e. one electrode of the storage capacitor CT6) locates is referred to as the main pixel region M. It should be noticed that, a layout method of the second pixel electrode and the second capacitor electrode line that form the storage capacitor CT5 and a layout method of the first pixel electrode and the first capacitor electrode line that form the storage capacitor CT6 are as that shown in FIG. 2, though the invention is not limited thereto.

Particularly, at least one of the first color pixel unit Pa, the second color pixel unit Pb and the third color pixel unit Pc further includes a sharing switch device TS, and the first color pixel unit Pa, the second color pixel unit Pb and the third color pixel unit Pc do not simultaneously have the sharing switch device. In the present embodiment, the first color pixel unit (for example, the red pixel unit) Pa and the second color pixel unit (for example, the green pixel unit) Pb are not configured with the sharing switch device, and the sharing switch device TS is disposed in the main pixel region M of the third color pixel unit Pc. The sharing switch device TS can be a bottom gate type thin film transistor or a top gate type thin film transistor, which includes a gate, a channel, a source and a drain. One end (the gate) of the sharing switch device TS is electrically connected to a next scan line SLn+1, and another end (the source or the drain) of the sharing switch device TS is electrically connected to one end (the second pixel electrode) of the storage capacitor CT6. Moreover, in the present embodiment, the third color pixel unit Pc further includes a sharing capacitor CS, where one end of the sharing capacitor CS is electrically connected to the sharing switch device TS, and another end of the sharing capacitor CS is electrically connected to the common voltage Vcom.

According to the above descriptions, in the present embodiment, the main pixel regions M and the sub pixel regions S of the first, the second and the third color pixel units Pa, Pb and Pc are respectively controller by the corresponding data lines, so that the main pixel regions M and the sub pixel regions S of the first, the second and the third color pixel units Pa, Pb and Pc can be charged to different voltage values through the corresponding data line.

Moreover, since the main pixel region M of the third color pixel unit Pc further includes the sharing switch device TS and the sharing capacitor CS, under functions of the sharing switch device TS and the sharing capacitor CS, the voltage value of the main pixel region M of the third color pixel unit Pc can be further different to the voltage values of the main pixel regions M of the other color pixel units. In detail, when a scan signal is input to the scan line SLn, the main pixel region M and the sub pixel region S are simultaneously charged. Then, when the scan signal is input to the next scan line SLn+1, although the main pixel region M and the sub pixel region S are still simultaneously charged, since the sharing switch device TS electrically connected to the scan line SLn+1 is turned on, the sharing capacitor CS electrically connected to the sharing switch device TS is charged. Now, under the function of the sharing capacitor CS, the voltage of the main pixel region M electrically connected to the sharing switch device TS has a voltage drop, so that the voltage value of the main pixel region M of the third color pixel unit Pc is smaller than the voltage values of the main pixel regions M of the other color pixel units.

In the present embodiment, a voltage of the sub pixel region S (the second pixel electrode) of the first color pixel unit Pa is $V_{a-2}$, and a voltage of the main pixel region M (the first pixel electrode) is $V_{a-1}$, so that a voltage ratio of the sub pixel region S (the second pixel electrode) and the main pixel region M (the first pixel electrode) of the first color pixel unit Pa is $V_{a-2}/V_{a-1}$. A voltage of the sub pixel region S (the second pixel electrode) of the second color pixel unit Pb is $V_{b-2}$, and a voltage of the main pixel region M (the first pixel electrode) is $V_{b-1}$, so that a voltage ratio of the sub pixel region S (the second pixel electrode) and the main pixel region M (the first pixel electrode) of the second color pixel unit Pb is $V_{b-2}/V_{b-1}$. A voltage of the sub pixel region S (the second pixel electrode) of the third color pixel unit Pc is $V_{c-2}$, and a voltage of the main pixel region M (the first pixel electrode) is $V_{c-1}$, so that a voltage ratio of the sub pixel region S (the second pixel electrode) and the main pixel region M (the first pixel electrode) of the third color pixel unit Pc is $V_{c-2}/V_{c-1}$. Here, any two of the voltage ratio ($V_{a-2}/V_{a-1}$), the voltage ratio ($V_{b-2}/V_{b-1}$) and the voltage ratio ($V_{c-2}/V_{c-1}$) are different. In the present embodiment, the voltage ratio $V_{a-2}/V_{a-1}$ of the first color pixel unit Pa is the same to the voltage ratio $V_{b-2}/V_{b-1}$ of the second color pixel unit Pb, and the voltage ratio ($V_{c-2}/V_{c-1}$) of the third color pixel unit Pc is different to the voltage ratios ($V_{a-2}/V_{a-1}$) and ($V_{b-2}/V_{b-1}$) of the first color pixel unit Pa and the second color pixel unit Pb.

In detail, a relationship of the voltage ratio ($V_{a-2}/V_{a-1}$) of the first color pixel unit Pa, the voltage ratio ($V_{b-2}/V_{b-1}$) of the second color pixel unit Pb, and the voltage ratio ($V_{c-2}/V_{c-1}$) of the third color pixel unit Pc is as follows.

$$0 < [(V_{c-2}/V_{c-1}) - (V_{a-2}/V_{a-1})]/(V_{a-2}/V_{a-1}) \leq 10\%$$

$$0 < [(V_{c-2}/V_{c-1}) - (V_{b-2}/V_{b-1})]/(V_{b-2}/V_{b-1}) \leq 10\%$$

Figure 13A:
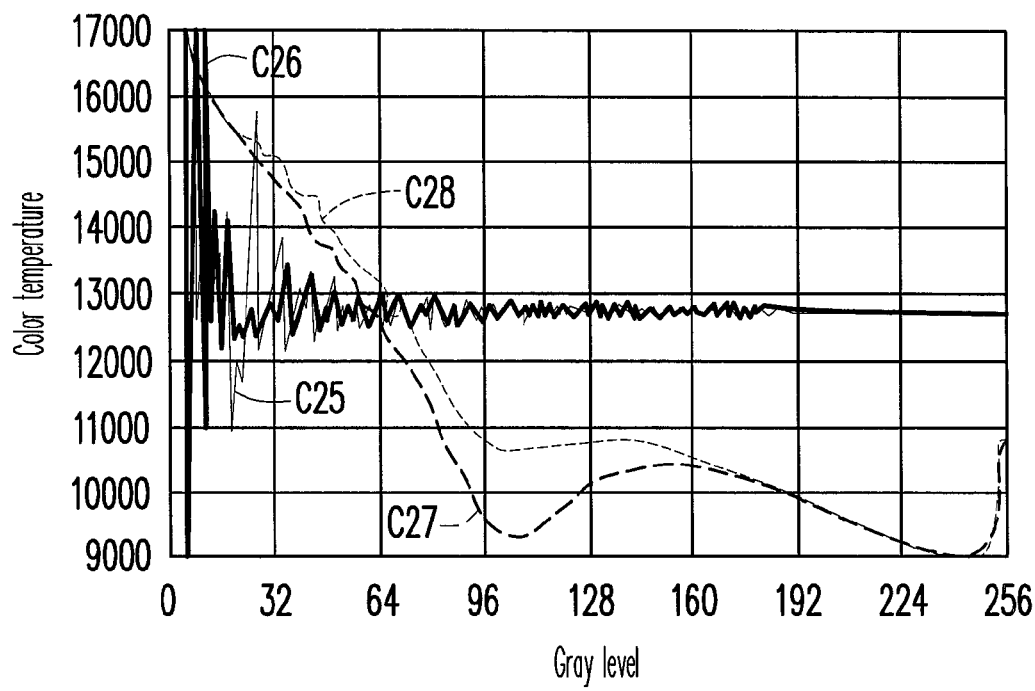
FIG. 13A is a gray-level and color temperature relationship diagram of the LCD panel according to an embodiment of the invention.
Figure 13B:
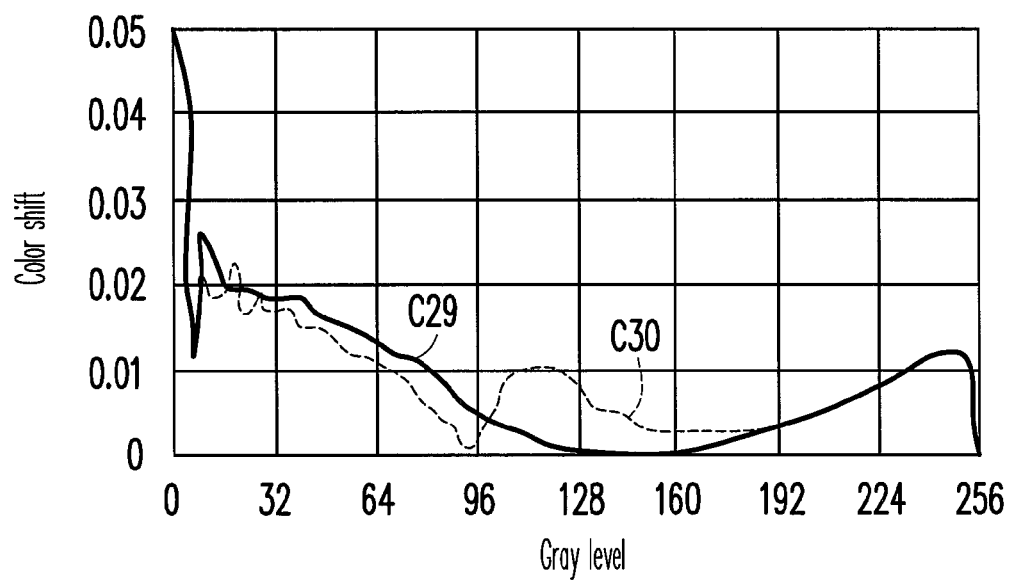
FIG. 13B is a gray-level and color shift relationship diagram of the LCD panel according to an embodiment of the invention.

For example, when the area ratios of the main pixel region M and the sub pixel region S of the first, the second and the third color pixel units Pa, Pb and Pc are 1:2, a ratio between the voltage of the main pixel region M of the first color pixel unit Pa and the voltage of the main pixel region M of the third color pixel unit Pc is 2.85/2.75, and a ratio between the voltage of the main pixel region M of the second color pixel unit Pb and the voltage of the main pixel region M of the third color pixel unit Pc is also 2.85/2.75, a gray-level and color temperature relationship of the LCD panel is as that shown in FIG. 13A, and a gray-level and color shift relationship of the LCD panel is as that shown in FIG. 13B.

In FIG. 13A, curve C25 represents a gray-level and color temperature relationship obtained when viewing the LCD having the conventional pixel array from a 0° viewing angle. Curve C26 represents a gray-level and color temperature relationship obtained when viewing the LCD having the pixel array of the present embodiment from the 0° viewing angle. Curve C27 represents a gray-level and color temperature relationship obtained when viewing the LCD having the conventional pixel array from a 45° viewing angle. Curve C28 represents a gray-level and color temperature relationship obtained when viewing the LCD having the pixel array of the present embodiment from the 45° viewing angle. In FIG. 13B, curve C29 represents a gray-level and color shift relationship obtained when viewing the LCD having the pixel array of the present embodiment from the 45° viewing angle. Curve C30 represents a gray-level and color shift relationship obtained when viewing the LCD having the conventional pixel array from the 45° viewing angle.

According to FIG. 13A and FIG. 13B, it is known that by additionally configuring the sharing switch device TS in the third color pixel unit (the blue pixel unit) Pc, the color shift problem of the side view image can be indeed mitigated compared to the conventional pixel array design.

Sixth Embodiment

Figure 14:
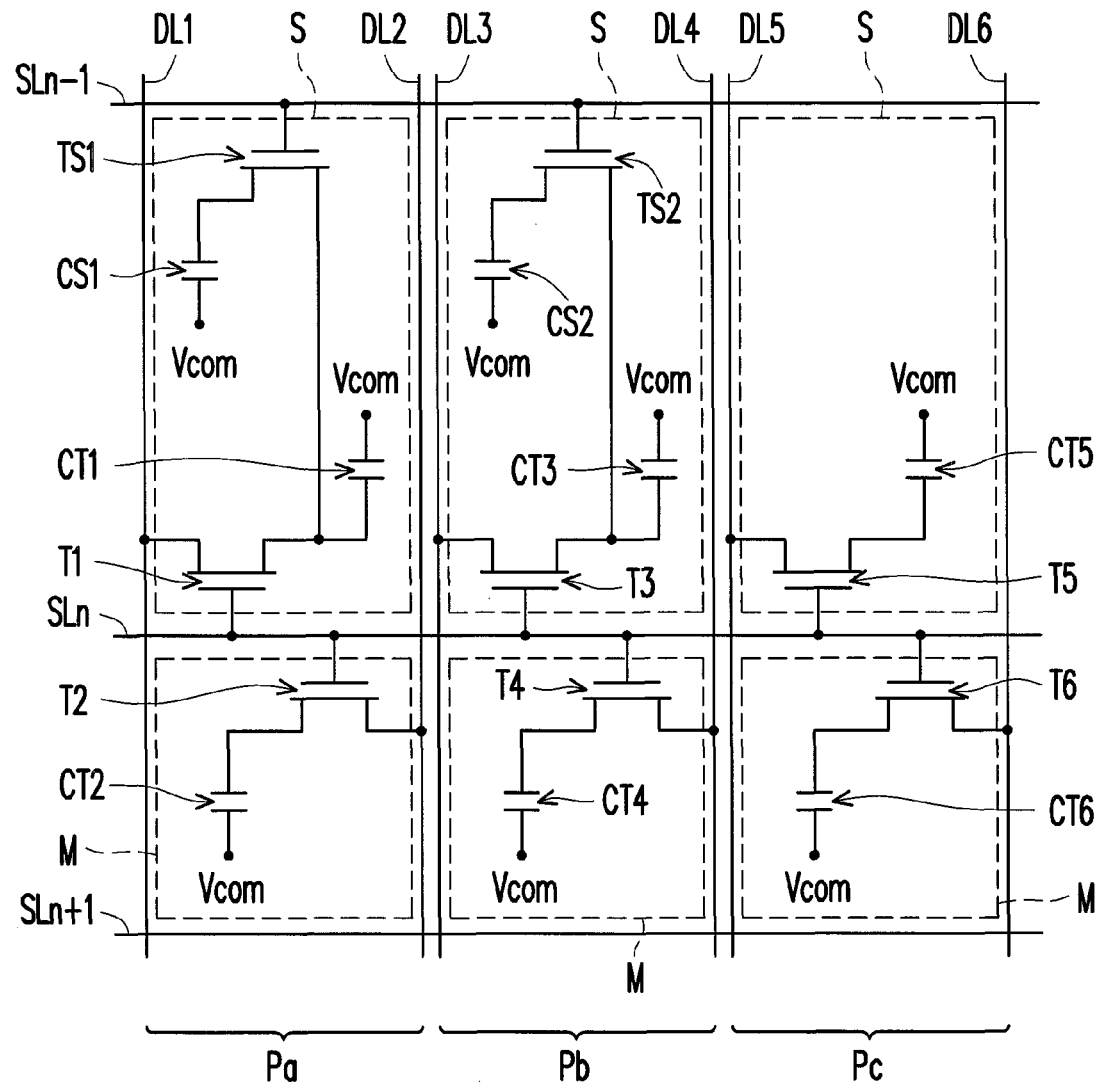
FIG. 14 is a schematic diagram of a pixel unit in a pixel array according to an embodiment of the invention.

FIG. 14 is a schematic diagram of a pixel array according to an embodiment of the invention. Referring to FIG. 14, the pixel array of FIG. 14 is similar to the pixel array of FIG. 12, so that the same or similar devices are represented by the same or similar symbols, and details thereof are not repeated. In the present embodiment, the first color pixel unit Pa and the second color pixel unit Pb respectively have sharing switch devices TS1 and TS2, and the third color pixel unit Pc does not have the sharing switch device. Preferably, the first color pixel unit Pa and the second color pixel unit Pb respectively have the sharing switch devices TS1 and TS2 and sharing capacitors CS1 and CS2 electrically connected to the sharing switch devices TS1 and TS2.

In the present embodiment, the sub pixel region S of the first color pixel unit Pa (for example, the red pixel unit) is configured with the sharing switch device TS1 and the sharing capacitor CS1, and the sub pixel region S of the second color pixel unit Pb (for example, the green pixel unit) is configured with the sharing switch device TS2 and the sharing capacitor CS2. However, the third color pixel unit Pc is not configured with the sharing switch device.

The sharing switch devices TS1 and TS2 can be bottom gate type thin film transistors or top gate type thin film transistors, which respectively include a gate, a channel, a source and a drain. One ends (the gate) of the sharing switch devices TS1 and TS2 are electrically connected to a last scan line SLn−1, and other ends (the source or the drain) of the sharing switch device TS1 and TS2 are electrically connected to one ends (the second pixel electrodes) of the storage capacitors CT1 and CT3, respectively. Moreover, one ends of the sharing capacitors CS1 and CS2 are electrically connected to the sharing switch devices TS1 and TS2 respectively, and the other ends of the sharing capacitors CS1 and CS2 are electrically connected to the common voltage Vcom.

According to the above descriptions, in the present embodiment, the main pixel regions M and the sub pixel regions S of the first, the second and the third color pixel units Pa, Pb and Pc are respectively controlled by the corresponding data lines, so that the main pixel regions M and the sub pixel regions S of the first, the second and the third color pixel units Pa, Pb and Pc can be charged to different voltage values through the corresponding data line.

Similarly, since the sub pixel regions S of the first and the second color pixel units Pa and Pb further include the sharing switch devices TS1, TS2 and the sharing capacitors CS1 and CS2, under functions of the sharing switch devices TS1 and TS2 and the sharing capacitors CS1 and CS2, the voltage values of the sub pixel regions S of the first and the second color pixel units Pa and Pb can be further different to the voltage value of the sub pixel region S of the third color pixel unit Pc.

In the present embodiment, a voltage of the sub pixel region S (the second pixel electrode) of the first color pixel unit Pa is $V_{a-2}$, and a voltage of the main pixel region M (the first pixel electrode) is $V_{a-1}$, so that a voltage ratio of the sub pixel region S (the second pixel electrode) and the main pixel region M (the first pixel electrode) of the first color pixel unit Pa is $V_{a-2}/V_{a-1}$. A voltage of the sub pixel region S (the second pixel electrode) of the second color pixel unit Pb is $V_{b-2}$, and a voltage of the main pixel region M (the first pixel electrode) is $V_{b-1}$, so that a voltage ratio of the sub pixel region S (the second pixel electrode) and the main pixel region M (the first pixel electrode) of the second color pixel unit Pb is $V_{b-2}/V_{b-1}$. A voltage of the sub pixel region S (the second pixel electrode) of the third color pixel unit Pc is $V_{c-2}$, and a voltage of the main pixel region M (the first pixel electrode) is $V_{c-1}$, so that a voltage ratio of the sub pixel region S (the second pixel electrode) and the main pixel region M (the first pixel electrode) of the third color pixel unit Pc is $V_{c-2}/V_{c-1}$. Here, any two of the voltage ratio ($V_{a-2}/V_{a-1}$), the voltage ratio ($V_{b-2}/V_{b-1}$) and the voltage ratio ($V_{c-2}/V_{c-1}$) are different. In the present embodiment, the voltage ratio $V_{a-2}/V_{a-1}$ of the first color pixel unit Pa is the same to the voltage ratio $V_{b-2}/V_{b-1}$ of the second color pixel unit Pb, and the voltage ratio ($V_{c-2}/V_{c-1}$) of the third color pixel unit Pc is different to the voltage ratios ($V_{a-2}/V_{a-1}$) and ($V_{b-2}/V_{b-1}$) of the first color pixel unit Pa and the second color pixel unit Pb.

In detail, a relationship of the voltage ratio ($V_{a-2}/V_{a-1}$) of the first color pixel unit Pa, the voltage ratio ($V_{b-2}/V_{b-1}$) of the second color pixel unit Pb, and the voltage ratio ($V_{c-2}/V_{c-1}$) of the third color pixel unit Pc is as follows.

$$0 < [(V_{c-2}/V_{c-1}) - (V_{a-2}/V_{a-1})]/(V_{a-2}/V_{a-1}) \leq 10\%$$

$$0 < [(V_{c-2}/V_{c-1}) - (V_{b-2}/V_{b-1})]/(V_{b-2}/V_{b-1}) \leq 10\%$$

Figure 15A:
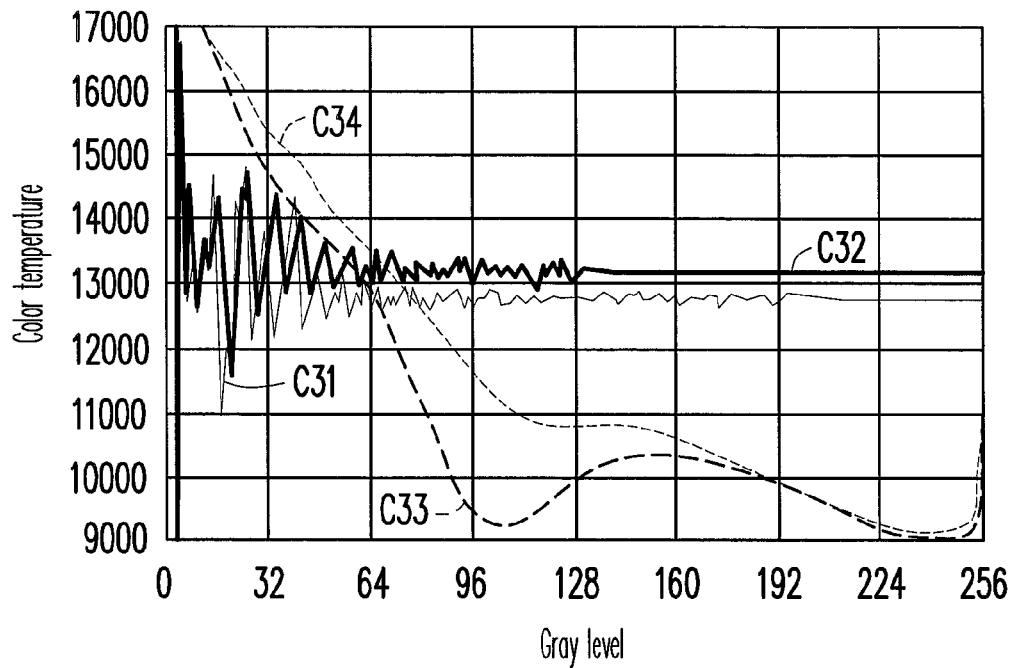
FIG. 15A is a gray-level and color temperature relationship diagram of the LCD panel according to an embodiment of the invention.
Figure 15B:
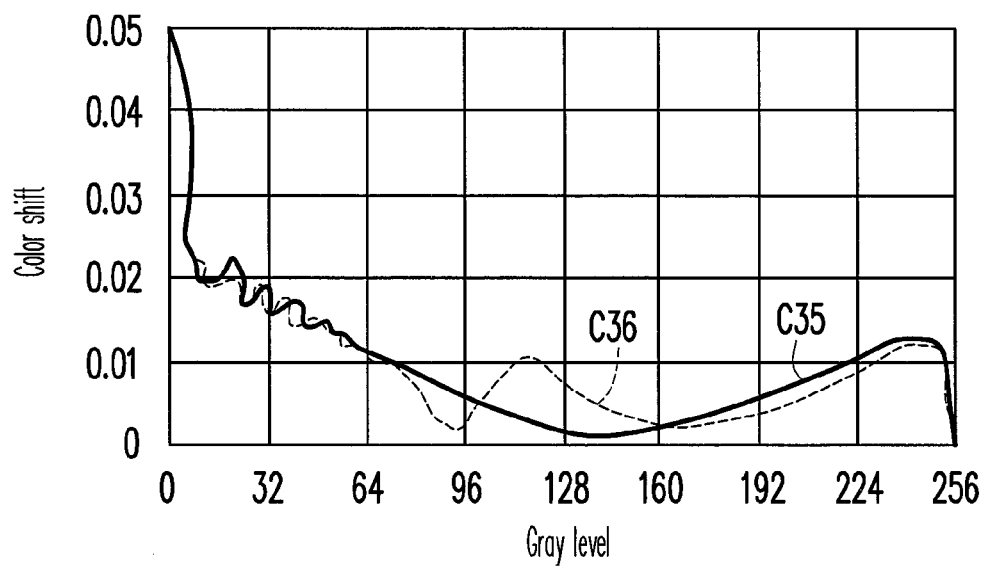
FIG. 15B is a gray-level and color shift relationship diagram of the LCD panel according to an embodiment of the invention.

For example, when the area ratios of the main pixel region M and the sub pixel region S of the first, the second and the third color pixel units Pa, Pb and Pc are 1:2, a ratio between the voltage of the sub pixel region S of the first color pixel unit Pa and the voltage of the sub pixel region S of the third color pixel unit Pc is 2.65/2.85, and a ratio between the voltage of the sub pixel region S of the second color pixel unit Pb and the voltage of the sub pixel region S of the third color pixel unit Pc is also 2.65/2.85, a gray-level and color temperature relationship of the LCD panel is as that shown in FIG. 15A, and a gray-level and color shift relationship of the LCD panel is as that shown in FIG. 15B.

In FIG. 15A, curve C31 represents a gray-level and color temperature relationship obtained when viewing the LCD having the conventional pixel array from a 0° viewing angle. Curve C32 represents a gray-level and color temperature relationship obtained when viewing the LCD having the pixel array of the present embodiment from the 0° viewing angle. Curve C33 represents a gray-level and color temperature relationship obtained when viewing the LCD having the conventional pixel array from a 45° viewing angle. Curve C34 represents a gray-level and color temperature relationship obtained when viewing the LCD having the pixel array of the present embodiment from the 45° viewing angle. In FIG. 15B, curve C35 represents a gray-level and color shift relationship obtained when viewing the LCD having the pixel array of the present embodiment from the 45° viewing angle. Curve C36 represents a gray-level and color shift relationship obtained when viewing the LCD having the conventional pixel array from the 45° viewing angle.

According to FIG. 15A and FIG. 15B, it is known that by additionally configuring the sharing switch devices TS1 and TS2 in the first and the second color pixel units (the red and green pixel units) Pa and Pb, the color shift problem of the side view image can be indeed mitigated compared to the conventional pixel array design.

Seventh Embodiment

Figure 16:
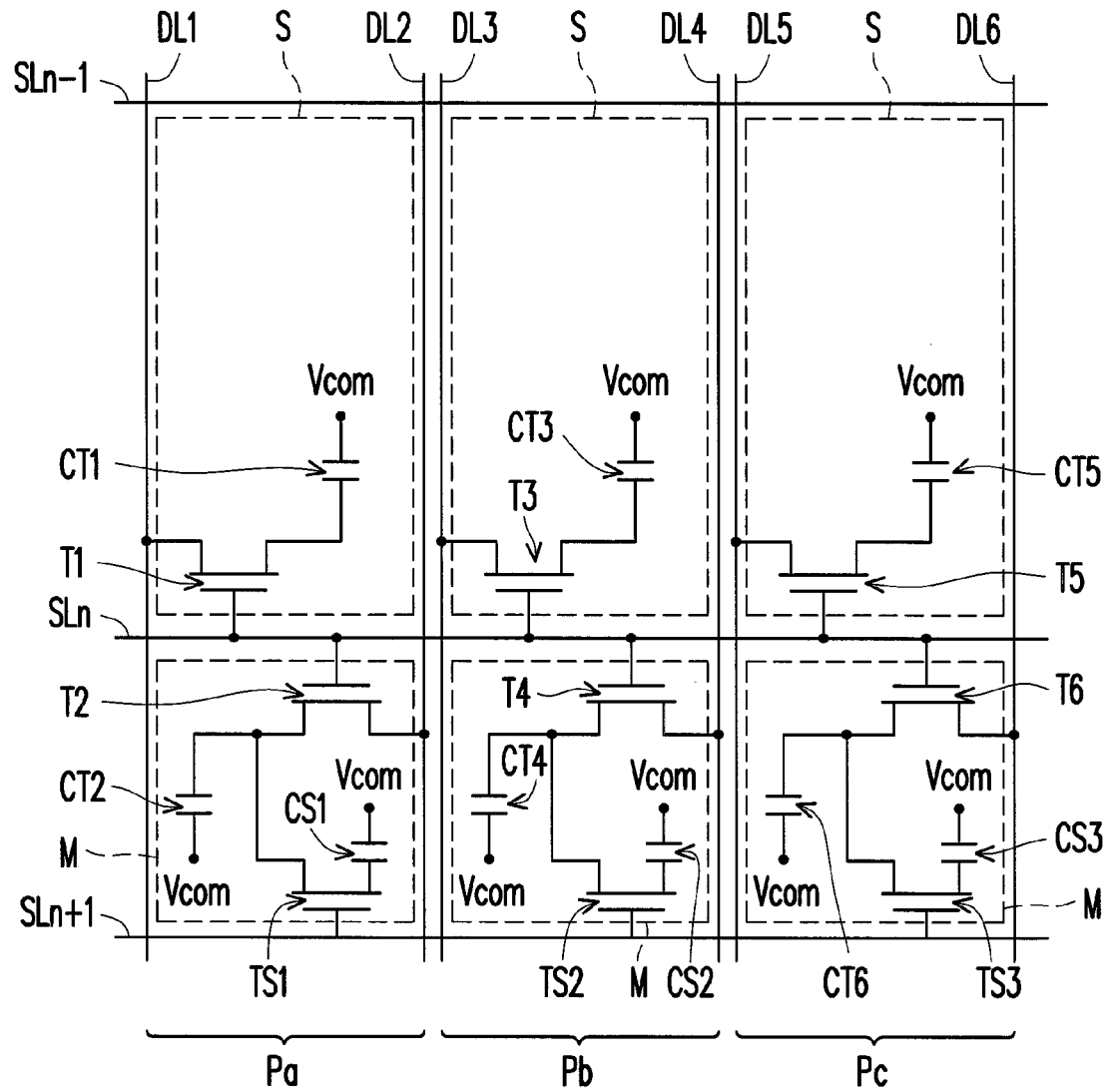
FIG. 16 is a schematic diagram of a pixel unit in a pixel array according to an embodiment of the invention.

FIG. 16 is a schematic diagram of a pixel array according to an embodiment of the invention. Referring to FIG. 16, the pixel array of FIG. 16 is similar to the pixel array of FIG. 12, so that the same or similar devices are represented by the same or similar symbols, and details thereof are not repeated. In the present embodiment, the first color pixel unit Pa, the second color pixel unit Pb and the third color pixel unit Pc respectively have sharing switch devices TS1, TS2 and TS3 and the sharing capacitors CS1, CS2 and CS3 respectively connected to the sharing switch devices TS1, TS2 and TS3. In the present embodiment, the sharing switch devices TS1, TS2 and TS3 and the sharing capacitors CS1, CS2 and CS3 of the first color pixel unit Pa, the second color pixel unit Pb and the third color pixel unit Pc are respectively disposed in the main pixel regions M, though the invention is not limited thereto. In other embodiments, the sharing switch devices TS1, TS2 and TS3 and the sharing capacitors CS1, CS2 and CS3 of the first color pixel unit Pa, the second color pixel unit Pb and the third color pixel unit Pc can also be disposed in the sub pixel regions S.

Particularly, capacitances of the sharing capacitors CS1, CS2 and CS3 of the first color pixel unit Pa, the second color pixel unit Pb and the third color pixel unit Pc are not totally the same. In the present embodiment, a difference between the capacitance of the sharing capacitor CS1 of the first color pixel unit Pa and the capacitance of the sharing capacitor CS2 of the second color pixel unit Pb is 0-10%, and preferably, the capacitance of the sharing capacitor CS1 of the first color pixel unit Pa is equal to the capacitance of the sharing capacitor CS2 of the second color pixel unit Pb. Moreover, the capacitance of the sharing capacitor CS3 of the third color pixel unit Pc is different to the capacitance of the sharing capacitor CS1 of the first color pixel unit Pa and the capacitance of the sharing capacitor CS2 of the second color pixel unit Pb.

As described above, in the present embodiment, since the main pixel regions M and the sub pixel regions S of the first, the second and the third color pixel units Pa, Pb and Pc are respectively controller by the corresponding data lines, the main pixel regions M and the sub pixel regions S of the first, the second and the third color pixel units Pa, Pb and Pc can be charged to different voltage values through the corresponding data line.

Moreover, since the sharing capacitors CS1, CS2 and CS3 in the first, the second and the third color pixel units Pa, Pb and Pc are different, under functions of the sharing capacitors CS1, CS2 and CS3, the voltage values of the main pixel regions M of any two of the first, the second and the third color pixel units Pa, Pb and Pc can be different. For example, by designing the capacitance of the sharing capacitor CS3 of the third color pixel unit Pc to be smaller than the capacitance of the sharing capacitor CS1 of the first color pixel unit Pa and the capacitance of the sharing capacitor CS2 of the second color pixel unit Pb, the voltage values of the main pixel regions M of the first and the second color pixel units Pa and Pb can be equivalent, and the voltage value of the main pixel region M of the third color pixel units Pc is different to the voltage values of the main pixel regions M of the first and the second color pixel units Pa and Pb.

In the present embodiment, a voltage of the sub pixel region S (the second pixel electrode) of the first color pixel unit Pa is $V_{a-2}$, and a voltage of the main pixel region M (the first pixel electrode) is $V_{a-1}$, so that a voltage ratio of the sub pixel region S (the second pixel electrode) and the main pixel region M (the first pixel electrode) of the first color pixel unit Pa is $V_{a-2}/V_{a-1}$. A voltage of the sub pixel region S (the second pixel electrode) of the second color pixel unit Pb is $V_{b-2}$, and a voltage of the main pixel region M (the first pixel electrode) is $V_{b-1}$, so that a voltage ratio of the sub pixel region S (the second pixel electrode) and the main pixel region M (the first pixel electrode) of the second color pixel unit Pb is $V_{b-2}/V_{b-1}$. A voltage of the sub pixel region S (the second pixel electrode) of the third color pixel unit Pc is $V_{c-2}$, and a voltage of the main pixel region M (the first pixel electrode) is $V_{c-1}$, so that a voltage ratio of the sub pixel region S (the second pixel electrode) and the main pixel region M (the first pixel electrode) of the third color pixel unit Pc is $V_{c-2}N_{c-1}$. Here, any two of the voltage ratio ($V_{a-2}/V_{a-1}$), the voltage ratio ($V_{b-2}/V_{b-1}$) and the voltage ratio ($V_{c-2}/V_{c-1}$) are different. In the present embodiment, the voltage ratio $V_{a-2}/V_{a-1}$ of the first color pixel unit Pa is the same to the voltage ratio $V_{b-2}/V_{b-1}$ of the second color pixel unit Pb, and the voltage ratio ($V_{c-2}/V_{c-1}$) of the third color pixel unit Pc is different to the voltage ratios ($V_{a-2}/V_{a-1}$) and ($V_{b-2}N_{b-1}$) of the first color pixel unit Pa and the second color pixel unit Pb.

In detail, a relationship of the voltage ratio ($V_{a-2}/V_{a-1}$) of the first color pixel unit Pa, the voltage ratio ($V_{b-2}/V_{b-1}$) of the second color pixel unit Pb, and the voltage ratio ($V_{c-2}N_{c-1}$) of the third color pixel unit Pc is as follows.

$$0<[(V_{c-2}/V_{c-1})-(V_{a-2}/V_{a-1})]/(V_{a-2}/V_{a-1})\leq 10\%$$

$$0<[(V_{c-2}/V_{c-1})-(V_{b-2}/V_{b-1})]/(V_{b-2}/V_{b-1})\leq 10\%$$

In the present embodiment, the capacitances of the sharing capacitors CS1, CS2 and CS3 of the first color pixel unit Pa, the second color pixel unit Pb and the third color pixel unit Pc are designed to be different, so as to mitigate the color shift problem of the side view image of the display panel.

In summary, by adjusting the extending directions of the slits of the pixel electrodes, the area ratios of the pixel electrodes, the voltage ratios of the pixel electrodes of the first color pixel unit, the second color pixel unit and the third color pixel unit and disposing the sharing switch devices and the sharing capacitors and combinations thereof, the color shift problem of the side view image of various color pixel units can be mitigated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A pixel array, comprising:
a first color pixel unit, a second color pixel unit and a third color pixel unit, wherein the first color pixel unit, the second color pixel unit and the third color pixel unit respectively comprise:
a scan line and a data line;
at least one active device, electrically connected to the scan line and the data line; and
a first pixel electrode, electrically connected to the active device, wherein the first pixel electrode has at least one first slit, and a first acute angle is between an extending direction of the first slit and an extending direction of the scan line, wherein any two of the first acute angle of the first color pixel unit, the first acute angle of the second color pixel unit, and the first acute angle of the third color pixel unit are different.

2. The pixel array as claimed in claim 1, wherein a relationship of the first acute angle $\theta_{a-1}$ of the first color pixel unit, the first acute angle $\theta_{b-1}$ of the second color pixel unit, and the first acute angle $\theta_{c-1}$ of the third color pixel unit is as follows:

$$0<\theta_{a-1}-\theta_{c-1}\leq 10°, 0<\theta_{b-1}-\theta_{c-1}\leq 10°.$$

3. The pixel array as claimed in claim 1, wherein a relationship of the first acute angle $\theta_{a-1}$ of the first color pixel unit, the first acute angle $\theta_{b-1}$ of the second color pixel unit, and the first acute angle $\theta_{c-1}$ of the third color pixel unit is as follows:

$$-10°\leq\theta_{a-1}-\theta_{c-1}<0, -10°\leq\theta_{b-1}-\theta_{c-1}<0.$$

4. The pixel array as claimed in claim 1, wherein the first color pixel unit, the second color pixel unit and the third color pixel unit respectively further comprise:

a second pixel electrode, electrically connected to the active device, wherein the second pixel electrode has at least one second slit, and a second acute angle is between an extending direction of the second slit and an extending direction of the scan line, wherein any two of the second acute angle of the first color pixel unit, the second acute angle of the second color pixel unit, and the second acute angle of the third color pixel unit are different.

5. The pixel array as claimed in claim 4, wherein a relationship of the second acute angle $\theta_{a-2}$ of the first color pixel unit, the second acute angle $\theta_{b-2}$ of the second color pixel unit, and the second acute angle $\theta_{c-2}$ of the third color pixel unit is as follows:

$$-10°\leq\theta_{a-2}-\theta_{c-2}<0°, -10°\leq\theta_{b-2}-\theta_{c-2}<0°.$$

6. The pixel array as claimed in claim 1, wherein the first color pixel unit, the second color pixel unit and the third color pixel unit respectively further comprise:

a second pixel electrode, electrically connected to the active device, wherein any two of an area ratio of the first pixel electrode and the second pixel electrode of the first color pixel unit, an area ratio of the first pixel electrode and the second pixel electrode of the second color pixel unit, and an area ratio of the first pixel electrode and the second pixel electrode of the third color pixel unit are different.

7. The pixel array as claimed in claim 6, wherein a relationship of the area ratio $(A_{a-1}/A_{a-2})$ of the first pixel electrode and the second pixel electrode of the first color pixel unit, the area ratio $(A_{b-1}/A_{b-2})$ of the first pixel electrode and the second pixel electrode of the second color pixel unit, and the area ratio $(A_{c-1}/A_{c-2})$ of the first pixel electrode and the second pixel electrode of the third color pixel unit is as follows:

$$-25\%\leq[(A_{c-1}/A_{c-2})-(A_{a-1}/A_{a-2})]/(A_{a-1}/A_{a-2})<0,$$

$$-25\%\leq[(A_{c-1}/A_{c-2})-(A_{b-1}/A_{b-2})]/(A_{b-1}/A_{b-2})<0.$$

8. The pixel array as claimed in claim 6, wherein the second pixel electrode has at least one second slit, and a second acute angle is between an extending direction of the first slit and the extending direction of the scan line, wherein the second acute angle of the first color pixel unit, the second acute angle of the second color pixel unit, and the second acute angle of the third color pixel unit are all the same.

9. The pixel array as claimed in claim 1, wherein the first color pixel unit, the second color pixel unit and the third color pixel unit respectively further comprise:

a second pixel electrode, electrically connected to the active device, wherein any two of a voltage ratio of the second pixel electrode and the first pixel electrode of the first color pixel unit, a voltage ratio of the second pixel electrode and the first pixel electrode of the second color pixel unit, and a voltage ratio of the second pixel electrode and the first pixel electrode of the third color pixel unit are different.

10. The pixel array as claimed in claim 9, wherein a relationship of the voltage ratio $(V_{a-2}/V_{a-1})$ of the second pixel electrode and the first pixel electrode of the first color pixel unit, the voltage ratio $(V_{b-2}/V_{b-1})$ of the second pixel electrode and the first pixel electrode of the second color pixel unit, and the voltage ratio $(V_{c-2}/V_{c-1})$ of the second pixel electrode and the first pixel electrode of the third color pixel unit is as follows:

$$0<[(V_{c-2}/V_{c-1})-(V_{a-2}/V_{a-1})]/(V_{a-2}/V_{a-1})\leq 10\%,$$

$$0<[(V_{c-2}/V_{c-1})-(V_{b-2}/V_{b-1})]/(V_{b-2}/V_{b-1})\leq 10.$$

11. The pixel array as claimed in claim 9, wherein the second pixel electrode has at least one second slit, and a second acute angle is between an extending direction of the second slit and the extending direction of the scan line, wherein the second acute angle of the first color pixel unit, the second acute angle of the second color pixel unit, and the second acute angle of the third color pixel unit are all the same.

12. A pixel array, comprising:

a first color pixel unit, a second color pixel unit and a third color pixel unit, wherein the first color pixel unit, the second color pixel unit and the third color pixel unit respectively comprise:

a scan line and a data line;

at least one active device, electrically connected to the scan line and the data line;

a first pixel electrode, electrically connected to the active device; and a second pixel electrode, electrically connected to the active device, wherein any two of an area ratio of the first pixel electrode and the second pixel electrode of the first color pixel unit, an area ratio of the first pixel electrode and the second pixel electrode of the second color pixel unit, and an area ratio of the first pixel electrode and the second pixel electrode of the third color pixel unit are different, and a relationship of the area ratio $(A_{a-1}/A_{a-2})$ of the first pixel electrode and the second pixel electrode of the first color pixel unit, the area ratio $(A_{b-1}/A_{b-2})$ of the first pixel electrode and the second pixel electrode of the second color pixel unit, and the area ratio $(A_{c-1}/A_{c-2})$ of the first pixel electrode and the second pixel electrode of the third color pixel unit is as follows:

$$-25\%\leq[(A_{c-1}/A_{c-2})-(A_{a-1}/A_{a-2})]/(A_{a-1}/A_{a-2})<0,$$

$$-25\%\leq[(A_{c-1}/A_{c-2})-(A_{b-1}/A_{b-2})]/(A_{b-1}/A_{b-2})<0.$$

13. The pixel array as claimed in claim 12, wherein the first pixel electrode has at least one first slit, and a first acute angle is between an extending direction of the first slit and an extending direction of the scan line, and the first acute angle of the first color pixel unit, the first acute angle of the second color pixel unit, and the first acute angle of the third color pixel unit are all the same, and the second pixel electrode has at least one second slit, and a second acute angle is between an extending direction of the second slit and the extending direction of the scan line, and the second acute angle of the first color pixel unit, the second acute angle of the second color pixel unit, and the second acute angle of the third color pixel unit are all the same.

14. The pixel array as claimed in claim 12, wherein any two of a voltage ratio of the second pixel electrode and the first pixel electrode of the first color pixel unit, a voltage ratio of the second pixel electrode and the first pixel electrode of the second color pixel unit, and a voltage ratio of the second pixel electrode and the first pixel electrode of the third color pixel unit are different.

15. The pixel array as claimed in claim 14, wherein a relationship of the voltage ratio ($V_{a-2}/V_{a-1}$) of the second pixel electrode and the first pixel electrode of the first color pixel unit, the voltage ratio ($V_{b-2}/V_{b-1}$) of the second pixel electrode and the first pixel electrode of the second color pixel unit, and the voltage ratio ($V_{c-2}/V_{c-1}$) of the second pixel electrode and the first pixel electrode of the third color pixel unit is as follows:

$$0 < [(V_{c-2}/V_{c-1}) - (V_{a-2}/V_{a-1})]/(V_{a-2}/V_{a-1}) \leq 10\%,$$

$$0 < [(V_{c-2}/V_{c-1}) - (V_{b-2}/V_{b-1})]/(V_{b-2}/V_{b-1}) \leq 10\%,$$

16. A pixel array, comprising:
a first color pixel unit, a second color pixel unit and a third color pixel unit, wherein the first color pixel unit, the second color pixel unit and the third color pixel unit respectively comprise:
a scan line and a data line;
at least one active device, electrically connected to the scan line and the data line;
a first pixel electrode, electrically connected to the active device; and
a second pixel electrode, electrically connected to the active device,
wherein any two of a voltage ratio of the second pixel electrode and the first pixel electrode of the first color pixel unit, a voltage ratio of the second pixel electrode and the first pixel electrode of the second color pixel unit, and a voltage ratio of the second pixel electrode and the first pixel electrode of the third color pixel unit are different, and a relationship of the voltage ratio ($V_{a-2}/V_{a-1}$) of the second pixel electrode and the first pixel electrode of the first color pixel unit, the voltage ratio ($V_{b-2}/V_{b-1}$) of the second pixel electrode and the first pixel electrode of the second color pixel unit, and the voltage ratio ($V_{c-2}/V_{c-1}$) of the second pixel electrode and the first pixel electrode of the third color pixel unit is as follows:

$$0 < [(V_{c-2}/V_{c-1}) - (V_{a-2}/V_{a-1})]/(V_{a-2}/V_{a-1}) \leq 10\%,$$

$$0 < [(V_{c-2}/V_{c-1}) - (V_{b-2}/V_{b-1})]/(V_{b-2}/V_{b-1}) \leq 10\%.$$

17. The pixel array as claimed in claim 16, wherein the first pixel electrode has at least one first slit, and a first acute angle is between an extending direction of the first slit and an extending direction of the scan line, and the first acute angle of the first color pixel unit, the first acute angle of the second color pixel unit, and the first acute angle of the third color pixel unit are all the same, and
the second pixel electrode has at least one second slit, and a second acute angle is between an extending direction of the second slit and the extending direction of the scan line, and the second acute angle of the first color pixel unit, the second acute angle of the second color pixel unit, and the second acute angle of the third color pixel unit are all the same.

18. A pixel array, comprising:
a first color pixel unit, a second color pixel unit and a third color pixel unit, wherein the first color pixel unit, the second color pixel unit and the third color pixel unit respectively comprise:
a scan line and a data line;
at least one active device, electrically connected to the scan line and the data line;
a first pixel electrode, electrically connected to the active device; and
a second pixel electrode, electrically connected to the active device,
wherein at least one of the first color pixel unit, the second color pixel unit and the third color pixel unit comprises a sharing switch device, and the first color pixel unit, the second color pixel unit and the third color pixel unit do not simultaneously have the sharing switch device.

19. The pixel array as claimed in claim 18, wherein the third color pixel unit has the sharing switch device, and the first color pixel unit and the second color pixel unit do not have the sharing switch device.

20. The pixel array as claimed in claim 18, wherein the first color pixel unit and the second color pixel unit respectively have the sharing switch device, and the third color pixel unit does not have the sharing switch device.

21. The pixel array as claimed in claim 18, wherein the sharing switch device is electrically connected to the second pixel electrode and is electrically connected to a next scan line or a last scan line.

22. The pixel array as claimed in claim 18, wherein a voltage ratio of the second pixel electrode and the first pixel electrode of the first color pixel unit is the same to a voltage ratio of the second pixel electrode and the first pixel electrode of the second color pixel unit, and a voltage ratio of the second pixel electrode and the first pixel electrode of the third color pixel unit is different to the voltage ratios of the second pixel electrodes and the first pixel electrodes of the first and the second color pixel units.

23. The pixel array as claimed in claim 22, wherein a relationship of the voltage ratio ($V_{a-2}/V_{a-1}$) of the second pixel electrode and the first pixel electrode of the first color pixel unit, the voltage ratio ($V_{b-2}/V_{b-1}$) of the second pixel electrode and the first pixel electrode of the second color pixel unit, and the voltage ratio ($V_{c-2}/V_{c-1}$) of the second pixel electrode and the first pixel electrode of the third color pixel unit is as follows:

$$0 < [(V_{c-2}/V_{c-1}) - (V_{a-2}/V_{a-1})]/(V_{a-2}/V_{a-1}) \leq 10\%,$$

$$0 < [(V_{c-2}/V_{c-1}) - (V_{b-2}/V_{b-1})]/(V_{b-2}/V_{b-1}) \leq 10\%.$$

24. A pixel array, comprising:
a first color pixel unit, a second color pixel unit and a third color pixel unit, wherein the first color pixel unit, the second color pixel unit and the third color pixel unit respectively comprise:
a first scan line, a second scan line and a data line;
at least one active device, electrically connected to the first scan line and the data line;
a first pixel electrode, electrically connected to the active device;
a second pixel electrode, electrically connected to the active device;
a sharing switch device, electrically connected to the second pixel electrode and the second scan line; and a sharing capacitor, electrically connected to the sharing switch device, wherein capacitances of the sharing capacitors of the first color pixel unit, the second color pixel unit and the third color pixel unit are not totally the same.

25. The pixel array as claimed in claim 24, wherein a difference between the capacitance of the sharing capacitor of the first color pixel unit and the capacitance of the sharing capacitor of the second color pixel unit is 0-10%, and the capacitance of the sharing capacitor of the third color pixel unit is different to the capacitance of the sharing capacitor of the first color pixel unit and the capacitance of the sharing capacitor of the second color pixel unit.

26. The pixel array as claimed in claim 24, wherein any two of a voltage ratio of the second pixel electrode and the first pixel electrode of the first color pixel unit, a voltage ratio of the second pixel electrode and the first pixel electrode of the second color pixel unit, and a voltage ratio of the second pixel electrode and the first pixel electrode of the third color pixel unit are different.

27. The pixel array as claimed in claim 26, wherein a relationship of the voltage ratio ($V_{a-2}/V_{a-1}$) of the second pixel electrode and the first pixel electrode of the first color pixel unit, the voltage ratio ($V_{b-2}/V_{b-1}$) of the second pixel electrode and the first pixel electrode of the second color pixel unit, and the voltage ratio ($V_{c-2}/V_{c-1}$) of the second pixel electrode and the first pixel electrode of the third color pixel unit is as follows:

$$0 < [(V_{c-2}/V_{c-1}) - (V_{a-2}/V_{a-1})]/(V_{a-2}/V_{a-1}) \leq 10\%,$$

$$0 < [(V_{c-2}/V_{c-1}) - (V_{b-2}/V_{b-1})]/(V_{b-2}/V_{b-1}) \leq 10\%.$$

28. The pixel array as claimed in claim 24, wherein the capacitance of the sharing capacitor of the third color pixel unit is smaller than the capacitance of the sharing capacitor of the first color pixel unit, and the capacitance of the sharing capacitor of the third color pixel unit is smaller than the capacitance of the sharing capacitor of the second color pixel unit.

* * * * *